US012229847B2

United States Patent
Heath et al.

(10) Patent No.: US 12,229,847 B2
(45) Date of Patent: Feb. 18, 2025

(54) VEHICLE TRAFFIC AND VEHICLE RELATED TRANSACTION CONTROL SYSTEM

(71) Applicant: Drivewyze Ltd., Edmonton (CA)

(72) Inventors: Brian Heath, Vancouver (CA); Tse Young (Fred) Ko, Edmonton (CA); Brian Mofford, Edmonton (CA)

(73) Assignee: Drivewyze Ltd., Edmonton (CA)

( * ) Notice: Subject to any disclaimer, the term of this patent is extended or adjusted under 35 U.S.C. 154(b) by 0 days.

(21) Appl. No.: 17/069,186

(22) Filed: Oct. 13, 2020

(65) Prior Publication Data
US 2021/0049725 A1 Feb. 18, 2021

Related U.S. Application Data

(62) Division of application No. 14/912,903, filed as application No. PCT/CA2014/050802 on Aug. 20, 2014, now Pat. No. 10,817,968.

(Continued)

(51) Int. Cl.
| | |
|---|---|
| *G06Q 50/40* | (2024.01) |
| *G06Q 10/06* | (2023.01) |
| *G07B 15/06* | (2011.01) |
| *G07C 5/00* | (2006.01) |
| *G07C 5/08* | (2006.01) |
| *G08G 1/0962* | (2006.01) |
| *G08G 1/0967* | (2006.01) |

(Continued)

(52) U.S. Cl.
CPC ............ *G06Q 50/40* (2024.01); *G06Q 10/06* (2013.01); *G07B 15/063* (2013.01); *G07C 5/008* (2013.01); *G07C 5/08* (2013.01); *G08G 1/0962* (2013.01); *G08G 5/0013* (2013.01); *H04L 67/12* (2013.01); *H04W 4/40* (2018.02); *G08G 1/096741* (2013.01); *G08G 1/096775* (2013.01)

(58) Field of Classification Search
CPC ...... G06Q 50/30; G06Q 10/06; G07B 15/063; G08G 1/0962; G08G 5/0013; H04L 67/12; H04W 4/046
See application file for complete search history.

(56) References Cited

U.S. PATENT DOCUMENTS

| | | |
|---|---|---|
| 6,125,173 A | 9/2000 | Jagadish et al. |
| 6,185,343 B1 | 2/2001 | Ikeda et al. |

(Continued)

OTHER PUBLICATIONS

Julia Numrich, Global Navigation Satellite System based tolling: state-of-the-art, p. 93-96 (Year: 2012).*

(Continued)

*Primary Examiner* — Ibrahim N El-Bathy
(74) *Attorney, Agent, or Firm* — Seed IP Law Group LLP

(57) ABSTRACT

A location enabled mobile wireless device and central system cooperate to provide traffic control such as vehicle inspection site services and toll station services. Traffic control information such as vehicle inspection site information and toll station information provider and sent to the central system. The mobile wireless device monitors its location and sends location and vehicle related information to the central system. The central system compares data from the third party provider and the mobile wireless device. The mobile wireless device or the central system take an action based on the comparison, such as toll payment or vehicle inspection site operations.

8 Claims, 12 Drawing Sheets

Related U.S. Application Data

(60) Provisional application No. 61/868,066, filed on Aug. 20, 2013.

(51) Int. Cl.
*G08G 5/00* (2006.01)
*H04L 67/12* (2022.01)
*H04W 4/40* (2018.01)

(56) References Cited

U.S. PATENT DOCUMENTS

| | | |
|---|---|---|
| 6,442,391 B1 | 8/2002 | Johansson et al. |
| 6,721,652 B1 | 4/2004 | Sanqunetti |
| 7,603,232 B2 | 10/2009 | Sin et al. |
| 8,330,626 B1 | 12/2012 | Adelson |
| 8,478,514 B2 | 7/2013 | Kargupta |
| 8,489,433 B2 | 7/2013 | Altieri et al. |
| 8,736,419 B2 | 5/2014 | McQuade et al. |
| 2006/0054680 A1 | 3/2006 | Feldman et al. |
| 2007/0194950 A1* | 8/2007 | Boss ................ G08G 1/096758 340/905 |
| 2007/0285280 A1 | 12/2007 | Robinson et al. |
| 2008/0028846 A1 | 2/2008 | Heath et al. |
| 2008/0132252 A1 | 6/2008 | Altman et al. |
| 2008/0249869 A1 | 10/2008 | Angell et al. |
| 2009/0089107 A1 | 4/2009 | Angell et al. |
| 2010/0324817 A1 | 12/2010 | Hansen et al. |
| 2011/0001638 A1 | 1/2011 | Pudar |
| 2011/0063138 A1 | 3/2011 | Berkobin et al. |
| 2012/0101883 A1 | 4/2012 | Akhter et al. |
| 2012/0130727 A1 | 5/2012 | Ahmed |
| 2012/0139696 A1* | 6/2012 | McQuade ............ G08G 1/0962 340/5.7 |
| 2012/0179363 A1* | 7/2012 | Pierfelice ........... G01C 21/3461 701/423 |
| 2012/0226434 A1* | 9/2012 | Chiu ................ G08G 1/096838 701/117 |
| 2013/0018705 A1 | 1/2013 | Heath et al. |
| 2013/0142385 A1* | 6/2013 | Mathieu ............... G01C 21/365 345/473 |
| 2013/0150075 A1 | 6/2013 | Fan |
| 2013/0151388 A1 | 6/2013 | Falkenborg et al. |
| 2014/0247160 A1* | 9/2014 | Glascock ............... G08G 1/095 340/907 |
| 2015/0242824 A1* | 8/2015 | Stafford ............. G06Q 20/0457 705/44 |
| 2019/0238944 A1* | 8/2019 | Balasubramanian ........................ H04N 21/4627 |

OTHER PUBLICATIONS

Hensher, D.A. et al., "Using values of travel time savings for toll roads: avoiding some common errors", Transport Policy 11:171-181, 2004.

* cited by examiner

VEHICLE TRAFFIC AND VEHICLE RELATED TRANSACTION CONTROL SYSTEM

FIELD

Vehicle Traffic and Vehicle Related Transaction Control

BACKGROUND

As vehicle traffic increases in volume, public and private road operators seek methods and systems for regulating vehicle traffic that allows them to cost effectively monitor, screen and toll vehicles travelling on public roads. An example of a roadside screening system is disclosed in the patent application titled "Thermal Inspection System," U.S. Pre-Grant Publication No. 2008/0028846, published Feb. 7, 2008. With the popularity of GPS-enabled smart phones, others have proposed enabling transactions based on a smart phone detecting that the smart phone is within a predefined geographic area (geofence). The current invention provides improvements in systems providing control, screening, and tolling of traffic flow using GPS-enabled smart phones.

BRIEF SUMMARY

There is provided a method of vehicle traffic control, the method comprising partially enabling a central processing system connected to a telecommunications network, in which the central processing system operates when fully operating by receipt of location signals sent from a mobile wireless device carried by a vehicle and the central processing system sending signals to the mobile wireless device in response to the signals from the vehicle, the central processing system being operated for an economically interested party related to the vehicle freely without subscription in a state of operation less than the fully operating state, monitoring the movement of the vehicle, computing savings that would have been achieved had the vehicle been using and following signals from the central processing system, and upgrading the free operation of the central processing system to a subscription service with full operation.

In an embodiment, the central processing system may comprise a vehicle clearance system, in which the vehicle clearance system operates by receiving a first dataset at the central processing system from a mobile wireless device upon the mobile wireless device entering a pre-defined geographic area at a vehicle inspection site, the mobile wireless device being carried by a vehicle and the first dataset including location data obtained by monitoring a location of the mobile wireless device and vehicle-related information, comparing at least a portion of the first dataset with a second dataset from a third party provider, the second dataset including rule-based data, including safety data, related to the movement of vehicles along roads, and sending a signal to the mobile wireless device indicative of whether the vehicle is permitted to bypass the vehicle inspection site.

In an embodiment, the central processing system comprises a toll payment system that, when fully functional, provides payment of a toll when the vehicle enters a defined geographic area corresponding to a toll station.

There is further provided a method of vehicle movement control comprising: while a mobile wireless device is being carried in a moving vehicle, periodically obtaining a location of the mobile wireless device, comparing the location to a set of stored geographic areas; when the location of the mobile wireless device is within any one of the set of geographic areas, communicating vehicle-related information and vehicle location information to a central processing system that comprises a traffic control system for determining whether an action should be taken, in which the traffic control system is initially provided to a user without subscription; monitoring the movement of the vehicle; computing savings that would have been achieved had the vehicle been using and following signals from the traffic control system; and upgrading the traffic control system to a subscription service.

In an embodiment, the traffic control system comprises a vehicle clearance system for vehicle inspection sites.

In an embodiment, the traffic control system comprises a toll payment system.

There is provided a method of vehicle traffic control using a central processing system connected to a telecommunications network, the method comprising: receiving a first dataset at the central processing system from a mobile wireless device upon the mobile wireless device entering a pre-defined geographic area at a vehicle inspection site, the mobile wireless device being carried by a vehicle and the first dataset including location data obtained by monitoring a location of the mobile wireless device and vehicle-related information; comparing at least a portion of the first dataset with a second dataset from a third party provider, the second dataset including rule-based data, including safety data, related to the movement of vehicles along roads; and sending a signal to the mobile wireless device indicative of whether the vehicle is permitted to bypass the vehicle inspection site, the signal causing a graphical sign to be displayed on the mobile wireless device instructing the vehicle whether to bypass the vehicle inspection site or not.

In an embodiment, receiving the first dataset comprises downloading from the mobile wireless device to the central processing system the first dataset containing the location data and vehicle-related information through a web service.

In an embodiment, the second dataset is obtained by the central processing system downloading, from the third party provider to the central processing system using a web service, a file containing the second dataset.

There is further provided a method of vehicle movement control, comprising: while a mobile wireless device is being carried in a moving vehicle, periodically obtaining a location of the mobile wireless device; comparing the location to a set of stored geographic areas; when the location of the mobile wireless device is within any one of the set of geographic areas, communicating vehicle-related information and vehicle location information to a central processing system that comprises a vehicle screening system for determining whether the vehicle should stop at a vehicle inspection site and the geographic areas are areas around vehicle inspection sites; and upon the vehicle entering a geographical area corresponding to a vehicle inspection site, receiving at the mobile wireless device a message from the central processing system that causes a graphical sign to be displayed on the mobile wireless device that is indicative of whether the vehicle should stop at or bypass the vehicle inspection site.

There is provided a method of vehicle movement control, comprising: while a mobile wireless device is being carried in a moving vehicle, periodically obtaining a location of the mobile wireless device; comparing the location to a set of stored geographic areas corresponding to vehicle inspection sites; and when the location of the mobile wireless device is approaching any one of the set of geographic areas, generating a warning signal for a user of the vehicle by displaying a graphical sign on the mobile wireless device.

There is provided a method of vehicle traffic control using a central processing system connected to a telecommunications network, the method comprising: enabling a vehicle clearance system, in which the vehicle clearance system operates by receiving a first dataset at the central processing system from a mobile wireless device upon the mobile wireless device entering a pre-defined geographic area at a vehicle inspection site, the mobile wireless device being carried by a vehicle and the first dataset including location data obtained by monitoring a location of the mobile wireless device and vehicle-related information, comparing at least a portion of the first dataset with a second dataset from a third party provider, the second dataset including rule-based data, including safety data, related to the movement of vehicles along roads, and sending a signal to the mobile wireless device indicative of whether the vehicle is permitted to bypass the vehicle inspection site; and the signal causing a graphical sign to be displayed on the mobile wireless device, in which the graphical sign has a format that is dependent on whether the vehicle clearance system is subscribed to or free.

There is provided a method of vehicle movement control, comprising: while a mobile wireless device is being carried in a moving vehicle, periodically obtaining a location of the mobile wireless device; comparing the location to a set of stored geographic areas; when the location of the mobile wireless device is within any one of the set of geographic areas, communicating vehicle-related information and vehicle location information to a central processing system that comprises a vehicle screening system for determining whether the vehicle should stop at a vehicle inspection site and the geographic areas are areas around vehicle inspection sites; and upon the vehicle entering a geographical area corresponding to a vehicle inspection site, receiving at the mobile wireless device a message from the central processing system that causes a graphical sign to be displayed on the mobile wireless device that is indicative of whether the vehicle should stop or bypass the vehicle inspection site, format of the graphical sign depending on whether the vehicle screening system is a subscription service or free service.

BRIEF DESCRIPTION OF THE DRAWINGS

There will now be described embodiments of a vehicle traffic control system, with reference to the figures by way of example, in which.

DETAILED DESCRIPTION

Figure 1:
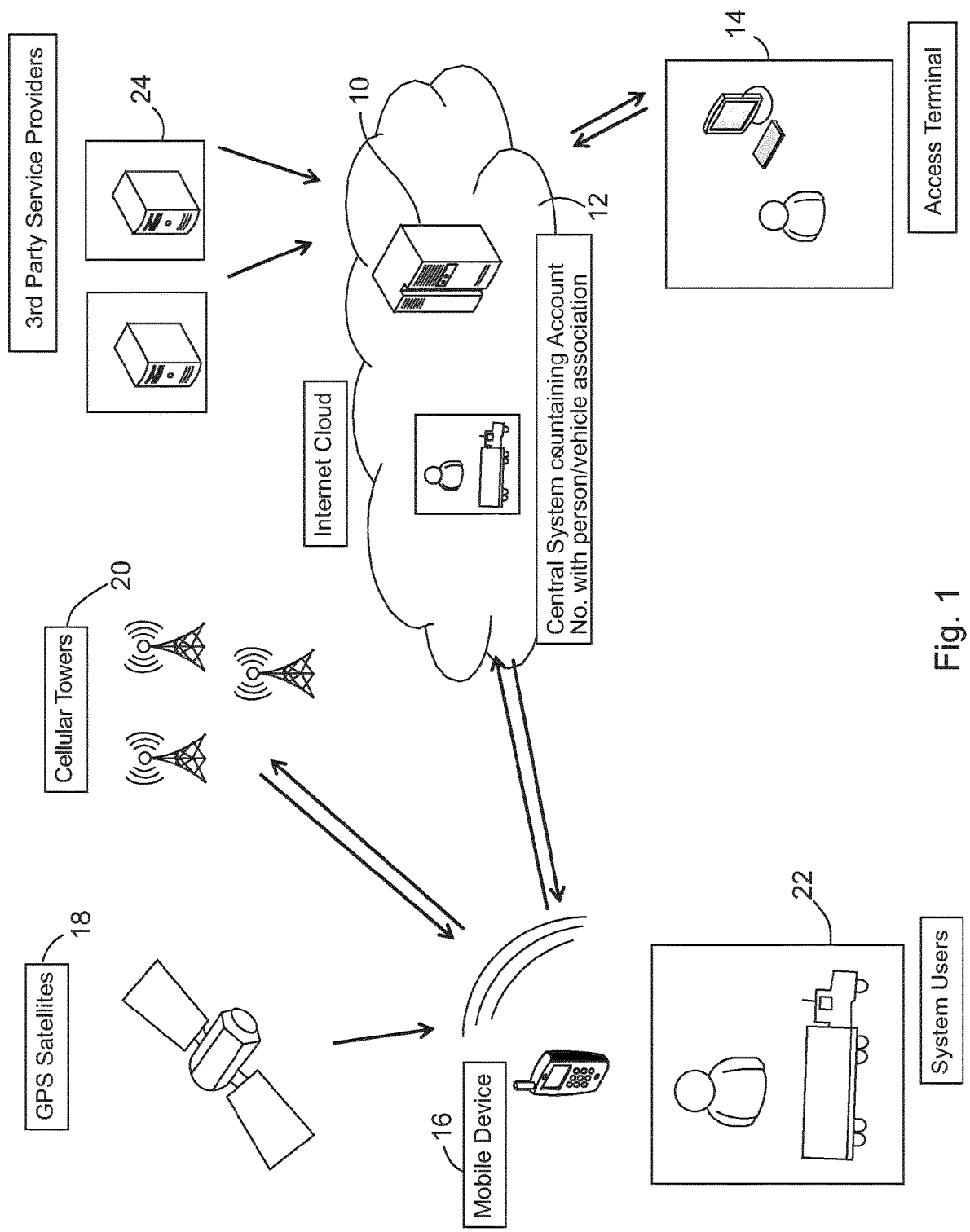
FIG. 1 is a network diagram showing a vehicle traffic control system.

Referring to FIG. 1, there is shown a system for providing vehicle traffic control through location based transaction services. The description here is of exemplary embodiments. Immaterial modifications may be made to the disclosed embodiments without departing from what is claimed.

The system comprises a central processing system 10 that uses one or more servers and related peripherals for connecting the server(s) to a telecommunications network such as the internet 12. The system is effected by configuration of the central processing system 10 using software that contains instructions for the servers to carry out the disclosed method steps. The servers need not be collocated and may reside in multiple servers (commonly referred to as the cloud) operated by a different party from the system operator. The servers may be accessed by a system operator through conventional input devices such as a keyboard or touch screen, and may be accessed through a conventional browser operating on a server, such as a local server 14 or through other software, such as dedicated software, operating on a server, such as a local server 14. The local server used by the system operator may be located anywhere in the world. The system 10 may also reside entirely or partly on the local server 14.

The communications channels shown in FIG. 1 by lines connecting the system elements may all be conventional communication channels. Examples of conventional communications channels include wireless links, optical links or wired links. The system may be implemented by loading software into the system elements and thus configuring the system elements as disclosed in this patent document to interact with each other in a novel manner. The implementation of the software enables a uniquely configured relationship between the system elements. Communications between the central traffic control system 10 and mobile wireless device 16 and between the central system 10 and a third party provider 24 preferably is a web based service using internet protocol. In a web based service, a server seeking to use the service opens a port on the server and sends messages with a web address or URL into the network which is relayed through the network as packets that are combined and delivered to the specified URL on the destination server. As such, the communication channels need not be dedicated channels but may use multiple links in a telecommunications network. The web service may be one suitable for operation on the current internet or such equivalents and replacements that are developed.

The central system 10 interacts with a location enabled mobile wireless device 16, such as a GPS-enabled smart phone. Location enabled refers to the ability of the mobile wireless device 16 to determine its location by reference to a GPS system 18 or other wireless sources 20. The mobile wireless device 16 also incorporates a processor capable of being programmed to monitor the location of the device and determine when the device has entered a specific geographic area or fixed spatial location (geofence) such as an inspection site, for example a vehicle screening area or weigh station, or toll location or other transportation service site. A toll location includes a toll road, a toll lane 92 on a roadway 90 (FIG. 6A) and a toll station 94 on a roadway 96 (FIG. 6B), depending on how tolls are collected on a particular road. The system 10 may work with a variety of toll systems including open road tolling systems where vehicles using a road are imaged and the image used to process a toll. An inspection site for vehicles includes any site where law enforcement agencies carry out inspection of vehicles. A weigh station is an example of a vehicle inspection site.

The processor of the mobile wireless device 16 should be sufficiently powerful to process the instructions disclosed in this patent document, which is the case with most commercially available smart phones. The mobile wireless device 16 is normally expected to be carried by a system user such as a personal vehicle or commercial vehicle 22. However, the mobile wireless device 16 may also be a wireless computing device integrated with the vehicle, including a device integrated with vehicle electronics and power systems, and is mobile in the sense that it moves around with the vehicle. The mobile wireless device 16 may also be a personal computing device that may be carried by a person.

The central system 10 may use a web service to connect to one or more third party service providers 24. The third party service providers may be for example governments or private toll operators, vehicle screening service providers or operators of roadside weigh stations.

Figure 2:
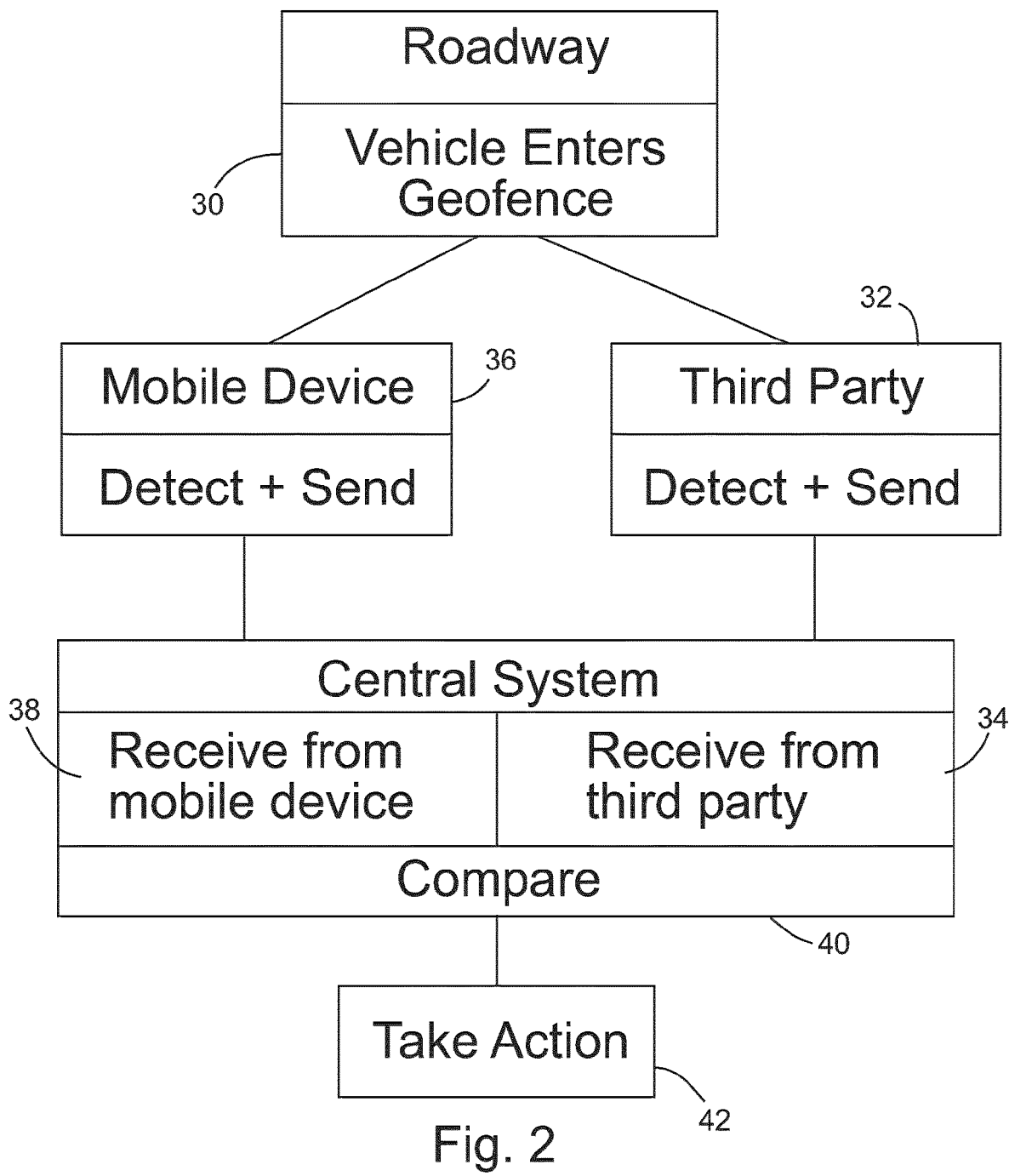
FIG. 2 illustrates basic steps in a vehicle control method.

Referring to FIG. 2, in a basic operation of the disclosed system 10, the system 10 receives a first dataset from the mobile wireless device 16 upon the mobile wireless device 16 entering a geographic area such as a vehicle screening area or toll station, compares at least a portion of the first dataset with a second dataset from a third party provider 24 and then takes an action based on the comparison. The first dataset may comprise vehicle-related information and location data. The datasets may take various forms such as the content of messages or contents of a file, but when embodied in the mobile wireless device 16, or on servers operated by a third party service provider 24 or in the central system 10, the dataset will have a physical manifestation as a file saved in persistent form in a memory. A particular memory is not shown in the Figures, but may reside on any server or form of electronic storage, and may be saved in the cloud. The second dataset may obtained by the system 10 using a web service to communicate with the third party service provider 24 and downloading a file containing vehicle-related information or rule-based data related to the movement of vehicles along roads or both. Examples of rule-based data related to the movement of vehicles along roads are safety rules and toll payment tables. Safety rules may determine whether a vehicle should be required to stop, and toll tables may determine the toll amount required to permit a vehicle to travel on a road. The downloading may take place at the same time as or after the vehicle 22 is at the geographic area. Depending on the application, a part of the downloading may occur before the vehicle 22 is at the geographic area. The downloading may take the form of the sending of a message through a web service. Vehicle-related information may be the presence of the vehicle at the geographic area, and the file may include other information relating to the user or the vehicle. The operation of this step is shown in FIG. 2, where step 30 shows the vehicle at the geographic area (enters the geofence), step 32 shows the third party detects the presence of the vehicle and sends a message to the central system in step 34. In the case of downloading occurring at the same time as the vehicle 22 is at a toll location, the system 10 may use a web service to create an open live link between the third party service provider 24.

When the vehicle enters the geofence at step 30, mobile wireless device 16, which has been monitoring the vehicle location, detects the entry of the vehicle 22 into the geofence and sends, step 36, a message to the central system 10 that contains the first dataset. In step 38, the central system 10 receives the first dataset from the mobile wireless device 16. The central system 16 may acquire the first dataset using a web service to download from the location enabled mobile wireless device 16 carried by the user or vehicle 22 to the central processing system 10 a file containing vehicle location data obtained by monitoring vehicle location with the location enabled mobile wireless device 16. The vehicle location data may be any form of data that identifies the presence of the mobile wireless device 16 at the geofence location including coded or encrypted data. If the geofence location is coded or encrypted, the downloading of the file need only take the form of an entry in a field in a message from the mobile wireless device 16 to the central system 10 that codes for the geographic area. The geofence location may be a weigh station geofence 76 (FIG. 5) or toll location geofence 98 or 99 (FIGS. 6A and 6B), for example.

In step 40, the central system 10 compares the contents of the two downloaded files or received messages, and in step 42 the central system takes an action based on the comparing step 40. Examples of portions of the dataset sent from the mobile wireless device 16 used in the comparison step include the vehicle location data (which geofence the vehicle entered) and the vehicle-related information, such as an account number. Comparing may take the form of checking that the dataset from the third party provider is related at least to the vehicle, the specific geofence or both. In some embodiments, the compared datasets may be associated with one another depending on the result of the comparing step. Associating may comprise linking two datasets, as for example if one refers to the other or both refer to each other or the datasets contain a common linking element. In some embodiments, the comparing may comprise both comparing and linking datasets. In the case of a weigh station, taking an action may comprise sending a signal to the mobile wireless device indicative of whether the vehicle is permitted to bypass the weigh station (red light or green light for example). The system may also use a second geofence near the weigh station but further down the road in the direction of traffic to determine whether the vehicle has complied with the bypass signal.

As shown in FIG. 1 and FIG. 2, the system provides a location-based transaction system, in which location of the mobile wireless device is the primary reference point for initiating system processes. Transactions are determined by location and bounded by system configuration. Individual transactions are pre-defined by the terms of service (system configuration) agreed to between service providers 24 (government agency, toll operator, commercial/retail entity) and system users 22 (truck drivers, vehicle drivers). The location-based transaction system 10 acts as an intermediary between service providers 24 and service users 22, and thus provides transaction capability. The location-based system replaces traditional transaction point equipment (roadside devices like dedicated short range communication devices or point of sale equipment like toll booths). The system is a platform to facilitate automated transactions between parties (for instance between government and truck drivers/between toll road operator and vehicle drivers) The transaction-system may also be the service provider. Service users 22 agree to utilize their GPS-enabled mobile wireless devices (or trackable mobile phones) 16 to access third party location-based services via the location-based transaction system 10. Mobile wireless device users 22 agree to automate transactions with service providers 22 based solely on the location of the mobile wireless device 16. For example, triggering of vehicle movement into a geo fence may initiate a weigh station bypass service or toll road payment service, but this only happens when service user agrees to use those services. The transaction authorization may be automated or require manual confirmation by the mobile wireless device user (automated weigh station bypass request or manual request/automated toll charging or user confirmed charging).

The location-based transaction system 10 may be configured to provide multiple location-based services such as weigh station bypass service and virtual toll booth service. Weigh station bypass service utilizes geofences set up on the approach lanes to a weigh station. User account information is passed to the service provider (government inspection services) and the service provider returns a transaction record (indicating bypass response). Toll road payment service may uses geofences set up on the entrance and exit ramps of a toll road. Service provider (toll road) would provide a virtual Point-of-sale (POS) receipt.

When a mobile wireless device 16 enters a geofence, an application residing on the mobile wireless device 16 generates a GPS event with a transaction ID. The GPS event is represented by a dataset that is stored on the mobile wireless device 16 and sent, for example through a wireless web service, to the central system 10. The data set defines both the fact that the vehicle is at a specific geofence and which vehicle is associated with the mobile wireless device 16, at least via an account number.

The mobile wireless device may be any wireless device that is portable, such as a smart phone (iPhone, Blackberry, etc.) and has the capacity for wireless connectivity within a network. The mobile wireless device and its respective network or networks form the backbone on which messages are sent. Any suitable protocol may be used for the messages. Mobile wireless device 16 may retrieve location data from GPS satellites or via cellular tower triangulation.

Figure 1A:
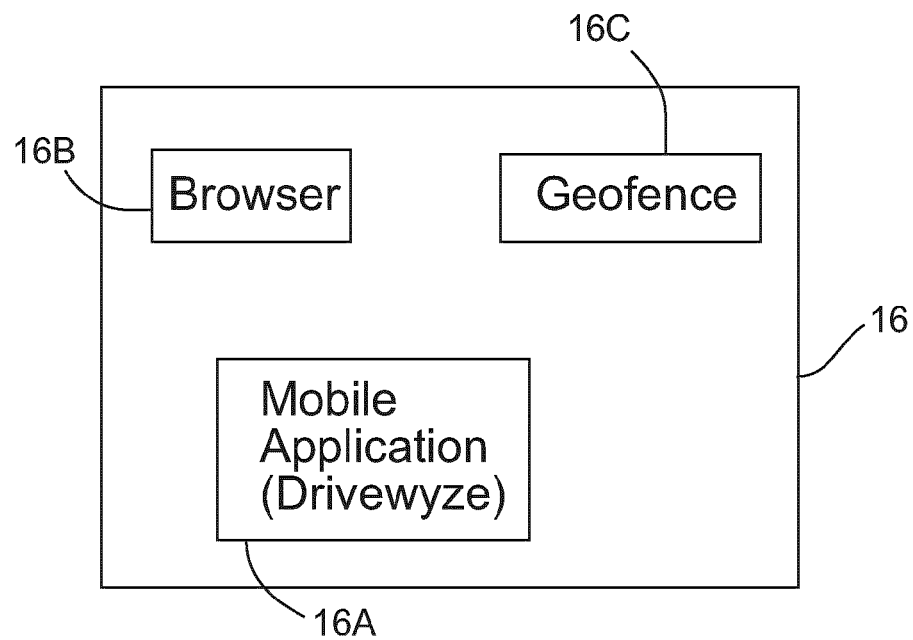
FIG. 1A shows applications that may reside on a mobile wireless device shown in FIG. 1.
Figure 1B:
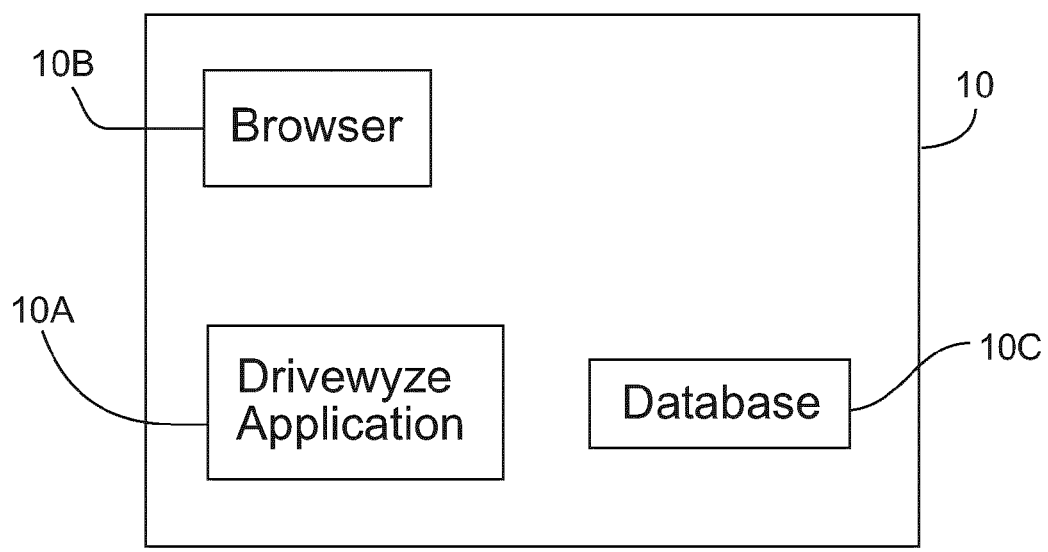
FIG. 1B shows applications that may reside on a central system shown in FIG. 1.

As illustrated in FIG. 1A, method steps carried out by the mobile wireless device 16 are controlled by a mobile application 16A (DRIVEWYZE™) that resides on the mobile wireless device along with a browser 16B and geofence application 16C. The mobile application 16A may call all functions of the mobile wireless device 16 such as communication software. As illustrated in FIG. 1B, method steps carried out by the central system 10 are controlled by a corresponding DRIVEWYZE™ application 10A, and the central system may include a browser 10B and other conventional software, as well as a database 10C that may include any of the datasets or databases referred to in this disclosure. The database 10C may also reside elsewhere on other servers and may be called when needed by the browser 10B or DRIVEWYZE™ application 10A. The application on the mobile wireless device 16 allows user to logon to central system under unique user account.

A user 22 has a corresponding User account that contains data such as vehicle, account holder or related information such as USDOT Number, License Plate Number, Vehicle VIN, Commercial Driver's License Number, GPS data, and electronic logs. Each user account has sufficient information to identify the vehicle. At set up, this information is provided to the service provider (central service 10) and the central service 10 generates a unique account ID that is preferably meaningless to a third party in relation to the vehicle and the user, but uniquely identifies the account and the associated vehicle. The account ID itself comprises vehicle-related information since it is intended to be used with a specific vehicle. Such an ID could be generated from a list.

The user 22 chooses when to turn the mobile application on. Normally, the user will turn on the mobile application at the beginning of a trip and keeps it on throughout the trip. The mobile wireless device 16 acts autonomously from the central service 10 and connects to the central service 10 when directed by the mobile application.

Once a user is logged on to the central service, the mobile wireless device 16 and user account are associated in the central system 10 through the unique account ID.

In a weigh station application, the mobile wireless device 16 will normally belong to the driver or vehicle owner and be carried by the driver in the vehicle. In a toll application, the mobile wireless device 16 may belong to anyone in the vehicle who is to pay the toll. No physical connection between the mobile wireless device 16, or user or vehicle 22 is required.

Figure 3:
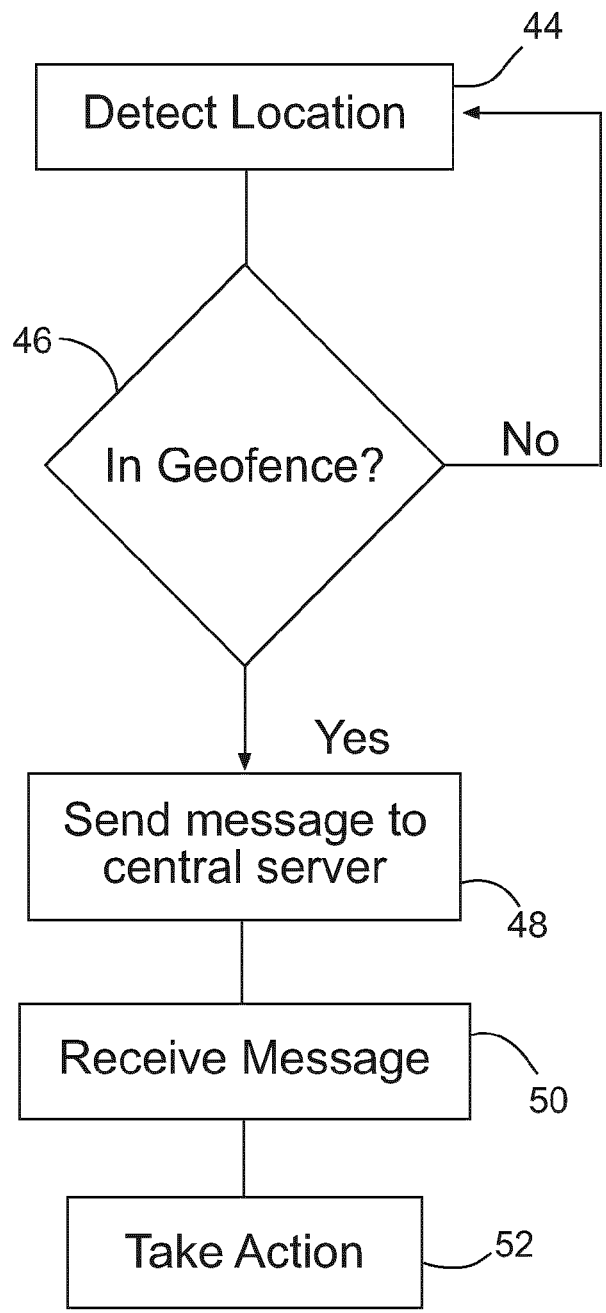
FIG. 3 illustrates basic steps in operation of a mobile wireless device.

In an embodiment, the mobile application contains a geofence database. When a mobile wireless device 16 enters a geofence, the mobile application initiates a data request/reply transaction with the central system 10. A geofence is a set of stored (pre-defined) geographic coordinates, which may be longitude and latitude, that define geographic areas. Referring to FIG. 3, each geofence works together with a set of instructions embodied within the mobile application that cause the mobile wireless device to (1) periodically find its geographic location either by the mobile wireless device's own GPS device or by triangulation with local cell towers (step 44), (2) compare the determined geographic location with the geographic areas (step 46), and (3) initiate a service request (step 48) when the mobile wireless device is within a specific geographic area. The mobile wireless device 16 continues monitoring the location of the mobile wireless device 16 (symbolized by the return path in FIG. 3).

The geographic areas may be areas 76 and 78 (FIG. 5) near or around a weigh station or a toll station. The mobile wireless device may be enabled with toll station geofences, weigh station geofences or both. Each geographic area that forms part of a geofence is preferably uniquely associated with a geofence ID that is stored on the mobile wireless device. The geofence ID comprises vehicle location information, although other ways may be used to identify vehicle location. Upon processing of the message from the mobile wireless device 16 at the central service 10, the central service 10 replies to the mobile wireless device 16, and upon receiving the reply (step 50), the mobile wireless device 16 or user 22 takes an action (step 52).

Various geofence types may be used. The geofence type may be stored in the geofence database along with an indicator of the type. One example is a wake up geofence, for example 2 miles before weigh station. At the wake up geofence, the mobile application checks for wireless coverage and notifies the driver (wake up message, which could be an audible, tangible or visible message) of the approaching weigh station. The visible message may be a graphical or virtual sign, such as an image of a stop sign or green light, that is stored on the mobile device and displayed in response to the vehicle arriving at the wake up geofence. Examples of virtual signs are given below and in the drawings.

Another example of a geofence is a bypass location, for example one mile before a weigh station. At the bypass location, a bypass decision transaction occurs in which the mobile application instructs the mobile wireless device to notify the central service to make a decision on bypass or report to the weigh station. The central service, upon receipt of the bypass decision request from the mobile wireless device, makes a determination on bypass or not, then notifies the mobile wireless device of the decision. The notification may be a message that causes the display on the mobile device of a graphical sign, such as an image of a stop sign or green light, that is stored on the mobile device and displayed in response to the vehicle arriving at the wake up geofence.

A further example of a type of geofence is a compliance geofence 78 (FIG. 5), situated possibly on the ramp of a weigh station 80 (FIG. 5), if location accuracy is good enough, or beyond the weigh station 80. At the compliance geofence 78, a message is initiated by the mobile application and sent by the mobile wireless device 16 to the central server 10 that the mobile wireless device 16 has entered the compliance geofence. A determination is then made, for example on vehicle transit time between the bypass geofence and compliance geofence as to whether the vehicle 22 complied with the bypass decision.

A further type of geofence is a change of jurisdiction geofence, for example at a state boundary, that is used to notify the central server that the mobile wireless device has changed jurisdictions. Upon receipt of a notification of a change of jurisdiction from the mobile wireless device, the geofences stored on the mobile wireless device may be updated.

The mobile unit does not need to be wirelessly connected to the central service until a geofence triggered service request data transmission begins. The mobile application sends a service request data transmission to central system. The request contains at least a user account ID (associated with a user/vehicle) and a geofence ID.

The central system receives the service request data transmission and processes the user account information (associated with user ID/vehicle ID/associated data/account information). The central service need only be sent the user account ID and Geofence ID. The central system processes the geofence ID to determine service request type (the service request type doesn't necessarily have to reside in the central system but may be included in the service request data transmission or be provided by some third party system).

The central system 10 then processes the service request as per account ID/geofence ID information and sends a service reply data transmission back to the mobile wireless device 16. In the case of weigh station bypass, the reply would be either a bypass or report to weigh station message. In the case of a toll road, it would be a payment or transaction confirmation. Factors (safety rules) that determine whether the reply is a bypass or a report to weigh station message may be set by the service provider and may include whether the vehicle has recently been weighed (for example within a few hours), the overall compliance record of the vehicle and the weight of the vehicle at the most recent weighing of the vehicle. Other factors include safety issues, safety credentials, tax status, insurance verification, state registration information and NCIC related alerts. Security agencies may specify their security and safety requirements. In some cases, the security agency may specify all vehicles must report. Remote surveillance devices might indicate whether a vehicle has safety issues or is driving erratically, and the output from these devices may be used to decide whether the vehicle should bypass or report.

When the mobile wireless device 16 triggers a GPS event by entering a geofence, a transaction file is created, stored in the mobile wireless device 16 in suitable persistent memory or even in the cloud, and sent as a dataset to the central service 10. The transaction file may include information such as when the vehicle 22 enters the geofence, when it leaves the geofence, how long it remains in the geofence in the form of for example multiple time stamps. The central system 10 receives the transaction file (dataset) and looks up rules and other stored data to determine the action to be taken. The rules and data may include a variety of rules and data stored at the central system or elsewhere such as in the cloud, and may be in part obtained from a law enforcement system, such as a weigh station. Examples of rules and data include whether the vehicle has stopped recently at a weigh station, and the corresponding rule may be to allow bypass if the vehicle stopped at a weigh station within a given period of time, or in the same journey. The data may therefore be specific to the vehicle or from a third party operator, such as cost tables. Obtaining the dataset with data and rules used to determine an action to be taken may be carried out live in real time, or before or after the GPS event occurred. The dataset may be partly obtained from data at the central service 10 and partly from data from a third party provider. The associating takes the form of a data association process where the dataset from the mobile wireless device 16 is associated with the dataset obtained from a third party provider 24. The associated data may be combined and stored in a file. Thus, for example, in a weigh station application, when the first dataset is received from the mobile wireless device 16, and a corresponding weight in a second dataset is obtained from a weigh station 24, the action taken may be the central system 16 appending vehicle weight to a vehicle record along with an indication of where the vehicle weight was taken.

Individual geofences can be managed by the central system or by manual or automated input by users on the mobile wireless device. Automated geofence management may include the creation of a 'congestion start' geofence determined by the mobile application as a result of the application's monitoring of speed and location. A manual geofence creation could be the manual entry of a geotag by a user to indicate 'bad weather' on the road.

Service Type includes but not limited to weigh station bypass (virtual bypass application) and compliance service, toll road related transactions (virtual toll both application), system, user, private or commercial notifications, transportation related notices like congestion ahead, bad weather.

The system preferably take advantage of technology convergence on the mobile wireless device (like GPS, GSM, Data, WiFi, Bluetooth, NFC, WiMAX) and information systems connectivity in the cloud to deliver a non-anticipated service to automate transactions previously requiring the physical interaction of systems. This system preferably uses location-based services and data associations (user/vehicle/account info) to synthesize a virtual transaction absent of a physical interaction initiating a process between parties. The mobile wireless device need not be physically connected to the user and vehicle and account info. The basis of the service is not the mobile wireless device itself. It is between the driver/vehicle and the service provider.

Characteristics of embodiments of the disclosed methods and related systems include the mobile wireless devices 16 and a central system 10, a mobile application residing on the mobile wireless device 16 that monitors for example GPS location of device, the central system 10 does not actually track the mobile wireless devices 16, the devices 16 themselves are self-monitoring for location-based processing, the mobile wireless device 16 does not have to connect wirelessly or communicate with the central system 10 on a continuous basis, the mobile application allows a unique association to be made between the mobile wireless device 16 and a system user 22 by the use of an account ID, the mobile wireless device 16 does not have to be hardwired to any other physical system, but rather is associated to other physical systems via the mobile application user information, the mobile application contains a database of geofences that reference GPS or triangulation coordinates, the mobile application monitors the GPS location of the mobile wireless device 16 utilizing the devices onboard GPS system or by cell tower triangulation, the mobile application initiates a service request data transmission to the central system once the mobile wireless device enters a geofence, by for example text, email, data, once channel opened up, the data transmission contents contain data that includes at a minimum account ID and geofence ID, the central service 10 receives the mobile application data transmission and processes the service request, the central service contains reference information, for example vehicle-related information discussed above, pertaining to the account ID and geofence ID, the central service performs processing based on the account ID and geofence ID combination, the processing includes a report or bypass decision followed by a compliance decision with a second geofence, the compliance decision may be based on how long the vehicle took to pass the weigh station or whether or not the vehicle took the weigh station ramp, for example if GPS accuracy is high enough, the central service 10 sends a service reply data transmission back to the mobile wireless device 16 within processing type timeframe boundaries, the mobile wireless device 16 receives the service reply data transmission from the central service, and the mobile application processes the service reply data and notifies user of service request result via an interface on the mobile wireless device 16.

If used, GPS functionality need not reside onboard the mobile wireless device 16, but may be hardwired or wirelessly connected to the mobile wireless device 16, enabling the mobile application to receive GPS data from the GPS unit. The mobile wireless device may be connected to other local systems in close proximity by hardwire or wirelessly and may be connected to vehicle engine or other systems of the vehicle for example.

The location of the mobile wireless device 16 may be monitored remotely using terrestrial geolocation methods including cellular tower triangulation. The geofence database may reside on the central system 10 or on a third party system. The Geofence IDs can be associated with different service request categories, for example toll or bypass. The Geofence database may be maintained and downloaded from the central system 10 to the mobile application. The mobile application may upload new or modified geofence with IDs to the central service when prompted by the mobile wireless device or central service, for example periodically (time based) or when a mobile wireless device changes jurisdictions. The user may choose to add geofence IDs to the central service either automatically or manually. Automated Geofence creation/modification may be initiated by either the central service or mobile application. Manual Geofence creation/modification may be initiated by either the central service or mobile application.

A geofence activation on the mobile application loaded on the mobile wireless device 16 may involve mobile application-based preprocessing prior to service request data transmission. That is, upon the mobile wireless device 16 recognizing a geofence, the mobile wireless device 16 acting through the mobile application looks up within the geofence database to determine the type of geofence, and then the mobile application modifies the data sent according to the type of geofence. Thus, if the geofence defines a weigh station, data relevant to the weigh station operator may be sent. At compliance (for example in relation to bypass), the mobile application may check what a vehicle did and compare with what it was supposed to do, so the mobile application may check then send message to the central service 10.

Various options may be provided by the mobile application. The user 22 may decide what types of processing requests to participate in. The user 22 may decide what categories of user ID data elements and geofence ID types to initiate and include in service request data transmissions. This may be carried out the mobile application prompting the user 22 to make a selection for a menu, and then the message content will be altered according to the selection made.

Other alternatives include the following. Data transmission between the mobile wireless device 16 and central service 10 may utilize digital data services or via SMS texting protocols for example. The user 22 may access other non-location-based data request services via the mobile application. The central service 10 may manage user ID and Geofence ID databases autonomously including the non-uniform management of unique mobile application database.

In the case of vehicle tolls, the geofence defines the toll area, and in one embodiment the account ID and geofence ID are communicated in the same way based on the mobile wireless device 16 entering a toll area. The account ID may be used to trigger a payment on a stored credit or debit card or other payment mechanism, or the communication from the device may include billing information for a credit card or other payment mechanism. The vehicle-related information sent as part of a dataset sent to the central system may include little more than the vehicle classification and license plate (from which a billing transaction may be generated), or may include or consist of billing information. The manner of billing may be set by the third party service provider. The third party service provider 24, in the case of a toll system, may use an enforcement system (VES) to detect a vehicle that does pay a toll. The toll system 24 may check vehicle identification information such as a license plate of a vehicle that does not pay a toll by capturing the license plate image with a camera. From this determination, the toll system 24 may send a list of license plates for example by a web service to the central system 10 for reconciliation along with a bill. The central system 10 checks datasets sent by mobile wireless devices 16 against the list from the toll system 24 and can take any of various actions such as charging the user of the mobile wireless device 16 and paying the toll service 24 based on the check.

In the case of a weigh station (FIGS. 6A and 6B), by-pass levels may be determined not only by traditional vehicle/carrier data elements, but by the amount of additional information each trucker/carrier is willing to share with law enforcement. Real-time bypass decisions for each driver/carrier approaching a weigh station are automatically provided to both driver and scale house operator based on the results of the screening criteria set by each weigh station.

The mobile application preferably allows for complete user-based configurability, allowing drivers/carriers to decide what data elements to share such as USDOT Number, License Plate Number, Vehicle VIN, Commercial Driver's License Number, GPS data, and electronic logs. Participating States or government agencies may have access to any user-authorized data for the purpose of electronically screening against vehicle weight, SAFER, PRISM, CDLIS, and State Tax and Permitting Systems. The system may provide 100% transparency in the bypass process, in that the screening criteria and thresholds set by each agency are weighed against an individual's safety/credentials/privacy information and published in real-time to the driver/carrier as a real-time percentage bypass rate. Bypass rates for each jurisdiction may be available on the drivers interface and may be automatically updated when any driver/carrier/privacy rules information is changed.

The system 10 may be a cloud based system that is accessed through a smartphone application operating for example on a mobile wireless device such as IPhone, Blackberry, or Android based devices. Drivers may register, pay and access the Pre-Clearance functions from the smart phone application. In order to eliminate any negative associations with tracking and costly data usage, the system may be designed to run almost entirely in stand-alone mode on the mobile phone platform; requiring neither third party tracking or costly data usage to operate effectively. The system may comprise a mobile-phone initiated preclearance transaction that is activated by location-linked operations residing entirely onboard the mobile wireless device. The mobile wireless device 16 itself need not be wired or permanently mounted to the vehicle, though it may have a wireless connection to other onboard systems via Bluetooth. The entire process may utilize less than 100 bytes of data transmission; which carries virtually no cost at even the most limited cellular data plans.

In an embodiment in which the mobile wireless device 16, including its mobile application, and the central system 10 provide a toll payment mechanism, the mobile application has design considerations that depart from traditional software interface designs because it is designed to be used primarily by drivers while they are operating a motor vehicle. This operational constraint imposes sever limitations on traditional design elements of the application design.

For example, the mobile application may provide switchable payment defaults and one-touch auto-pay cancellation. The mobile application processes transactions based on pre-defined user preferences. The option to change the default settings for transactions that occur when the user is driving a vehicle is unique. In a toll embodiment, the system is designed to cater to users who want an automated process to occur while the system 10 is processing a transaction and while the vehicle is in motion. The challenge in certain toll configurations is that the automated default transaction cannot be fixed and needs to meet the needs of the user while driving. Some drivers whose requirement is for a default payment process will need to have an application that supports a default payment processing setting. This setting will automate payment transactions without the need for any user interaction with the mobile application interface. This setting mitigates the risk of driver distraction while driving a vehicle and offers the cancellation of an automated payment transaction with a single touch or swipe action on the user interface. The development of a single auto-pay transaction cancellation is unique in software interface development where traditional one-touch payment authorizations require a default user interaction with the application interface.

Figure 4:
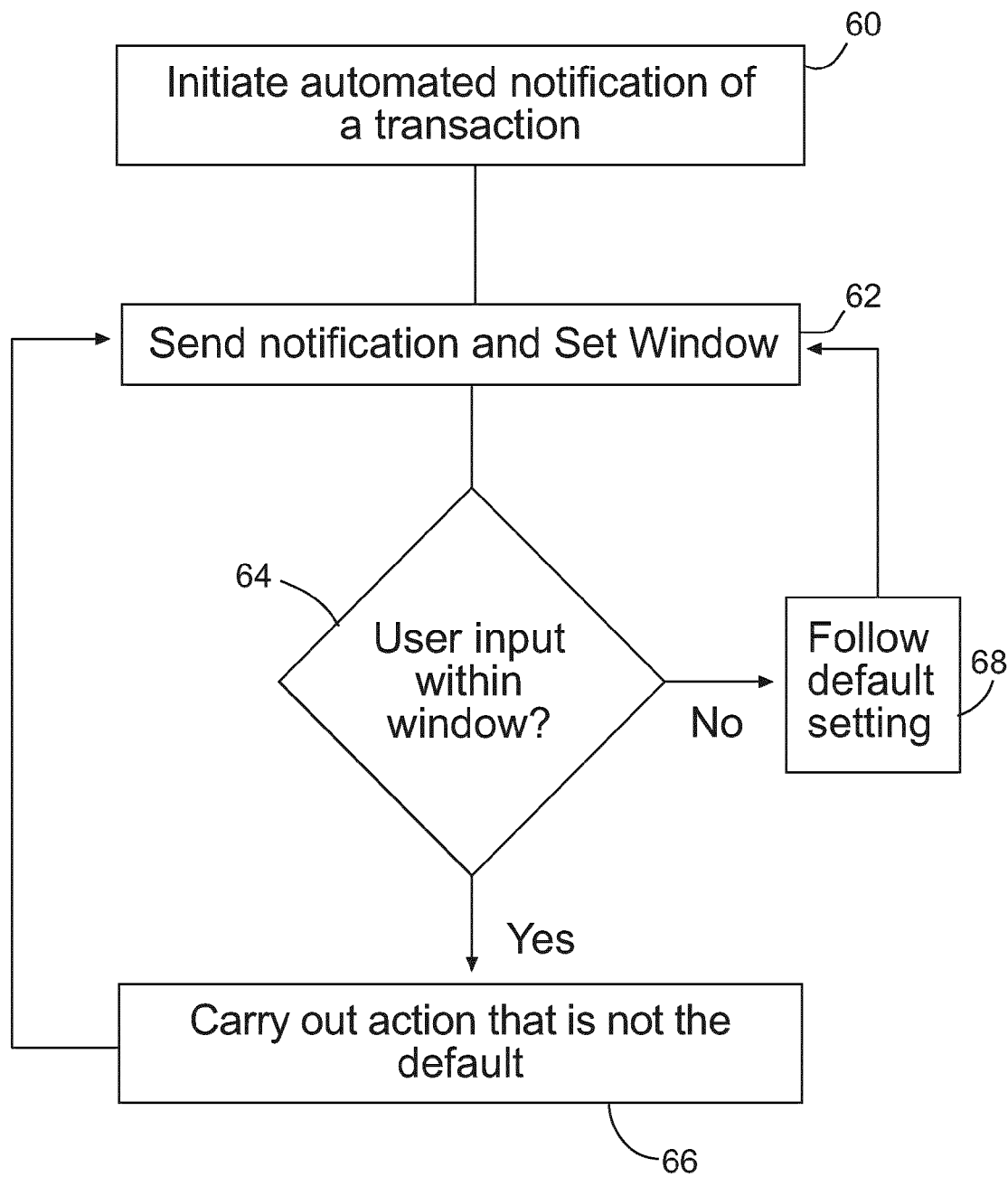
FIG. 4 shows basic steps in an autopay transaction cancellation.

An embodiment of an auto-pay transaction cancellation is illustrated in FIG. 4. In method step 60, an automated transaction notification is initiated by the user on a computing device such as a mobile wireless device 16. The automated notification takes place from time to time without participation of a user based upon a rule. The computing device is set to carry out or not carry out the transaction according to a default setting of the computing device. The default setting may be user changeable or may be a fixed setting of the computing device according to the mobile application on the computing device. The rule may be time based, for example a monthly payment, or may be triggered by an event, such as the mobile wireless device 16 entering a toll area. In a toll embodiment, the transaction is a toll payment triggered by proximity of a mobile wireless device to a toll station. Proximity of the mobile wireless device to a toll station may be determined by a location system onboard the mobile wireless device, such as a GPS system or triangulation system. In step 62, the user is notified by the mobile wireless device about the transaction. Any suitable notification may be used, such as an audible, tangible (for example a vibration) or visible notification. A visible notification may comprise a graphical sign displayed to the user. When the user is notified of the transaction, the mobile wireless device enables a window within which the mobile wireless device 16 is set to respond to a selected user input to the mobile wireless device 16 to cause the default action not to occur. At steps 64 and 66, if the user responds with the selected user input within the window, the action of the mobile wireless device is changed from the default. Thus, if the default is to carry out the transaction automatically, the user input cancels the transaction. If the default is to not carry out the transaction automatically, the user input allows the transaction to be carried out automatically. If the user does not respond, the mobile wireless device 16 acts in accordance with the default setting (step 68) and continues to monitor the next automated notification. The cancellation may be a onetime cancellation relating only to the specific transaction that the user was notified of. The user input may be a single input, such as a tap on a touch screen or the pressing of any key or a specific key. In some embodiments, the device may be a tethered computing device rather than a mobile wireless device.

Thus, as illustrated in FIG. 4, the mobile wireless device may allow a user to set the default setting to manual pay of a toll or other transaction. This setting is catered to infrequent users who do not utilize the automated transactions of the application as their default requirement. Instead, these users prefer to manually authorize the payment transaction and in this way, follow a traditional payment authorization action, but only in the event they chose to cancel their default decision to not automatically process a payment transaction. For example, a user does not usually utilize a managed toll lane and travels adjacent to said lane in a public lane that requires no toll payment. The user may set their payment default setting to manual pay, so that as the vehicle approached the toll area the interface simply gives the user notification of the opportunity to pay for the toll automatically using the application and provides a time limit for the user to cancel the default action of non-payment. In the event the user cancels the non-payment with a manual touch of the screen, then an automated electronic payment will occur. User interaction with the interface in this case was prompted by a canceling of a default setting, and would therefore require interaction with the user only in cases where the users actions do not follow their standard selection.

The mobile wireless device 16 in the toll situation facilitates financial payment services to toll road users via an onboard electronics unit or application enabled device. The computing device may include a cellular phone, smartphone, tablet, laptop, mobile computer or other purpose-built onboard electronics devices that supports the disclosed application.

In a further embodiment, the disclosed mobile application provides for the unique asynchronous processing of toll payments between the toll road operator and the central system 10. A user first registers with the central system, and an account is created with account holder vehicle data. The central service also obtains toll data from a third party toll service provider. The user approaches a toll facility paypoint and the mobile application utilizes the location-based processing to determine the toll facility being approached. The central system 10 (back office) is then utilized to access both account holder vehicle data and the participating toll agency cost tables. The central system 10 calculates the anticipated toll charge by comparing the vehicle classification on record with the central system 10 to the matching vehicle class provided in the toll cost table. An anticipated toll charge is then utilized to determine the amount that will be deducted from the users account when the vehicle enters the toll area. The validation of the vehicle entering the toll area is conducted by tracking the GPS coordinates of the mobile wireless device utilizing the toll road. This step corresponds to step 36 in FIG. 2 in which the mobile wireless device 16 monitors its location and creates and sends a dataset that contains vehicle location data. The vehicle location data may be coded to the toll station or may comprise other forms of identifying the geographic area corresponding to the toll station.

Asynchronously, the toll road agency (third party) detects the vehicle with a mobile wireless device 16 entering the toll area but has no way of determining whether the vehicle has a mobile application onboard to carry out location enabled services disclosed here. The toll agency lane Violation Enforcement System (VES) then captures identifying information on the vehicle passing into the toll road area so as to support the ability to charge said vehicle with a toll amount after the fact. Violation enforcement systems for toll roads are conventional. Identifying information such as the vehicle license plate number is collected for use in the payment collections process. Part of this process includes the comparison of a violators license plate information with a list of license plates held in the toll agencies own databases. The license plate database of an agency may include license plate numbers of vehicles utilizing transponders or other payment agencies that utilize license plate numbers to register vehicles with a toll agency for the purposes of automating toll payments based on license plate numbers. In one embodiment, it is proposed that the toll agency license plate database will include a list of license plates associated with the operator of the central system 10. In this manner, the toll agency can determine which toll road charges should be sent to the central system 10 for payment and settlement. Thus the toll agency (third party provider) sends a dataset to the central system 10 that includes a list of license plate numbers. License plate numbers or other identifying information comprise a characteristic of the vehicle that has passed through a toll station. This steps corresponds to step 32 in FIG. 2.

After detection and sending of vehicle-related data, the central system reconciles the account corresponding to the vehicle by comparing the dataset received from the third party provider and the dataset received from the mobile wireless device 16. This steps corresponds to step 40 in FIG. 2.

The central system 10 receives a toll charge for the mobile wireless device 16 that has passed through the toll area and reconciles the actual toll charge with the charge anticipated by the toll event. In the event that the charges do not match, then the central system 10 will adjust the account balance of the mobile wireless device 16 accordingly and settle the transaction with the toll agency directly. In this design, two asynchronous toll events are reconciled by the central system 10. Thus, the action contemplated by step 42 of FIG. 2 may include making a payment on behalf of the user of the mobile wireless device 16, reconciling the user's account, delaying or aggregating payments, and other actions.

An advantage of the central system 10 is that the toll agency can utilize existing violation enforcement systems to support the toll payments incurred by the mobile wireless devices 16 without having to invest the capital required to support the mobile wireless devices 16 communicating directly with toll road lane equipment. This asynchronous architecture support is believed to provide a unique solution to the utilization of GPS-enabled system for toll payment solutions.

The central system 10 allows users to access services such as toll payments that require real-time or delayed financial payments. The challenge with financial payments involves the managing of transaction costs. Transaction costs include credit/debit/charge card transaction-related costs borne directly by the user or vendor. Transaction costs negatively impact the operation of the central system 10 since users may be reluctant to forego transaction costs for each and every toll payment transaction. Instead, the central system 10 may use a pre-paid account model similar to those utilized currently by toll roads. A user deposits funds into an account managed by the central system 10. Independent toll charges can be deducted from the account without incurring additional transactions costs beyond the pre-pay amount. The central system 10 may provide an additional payment process that handles how and when actual payments are processed through a user's account to minimize transaction fees beyond that supported by the traditional prepay model. An example of this would be a user whose prepaid account balance falls below some threshold level or the amount required to pay a real-time toll transaction. A traditional system would notify the driver of the low-balance by a variety of real-time or non-real time methods, and may even support automated payment based on the payment guarantee held on account by the toll agency. The central system 10 need not automatically process the payment transaction, but rather may process a payment pre-authorization and monitor the account's activities over the allowed pre-authorization settlement window. If additional toll charge events occur, the central system 10 may continue to process pre-authorizations, but need not process the more expensive payment transaction until necessary. With this method, a payment transaction is processed only when required and may cover multiple pre-authorizations at once, thereby minimizing transaction costs for the end user.

The central system 10 may provide value added services by creating data association links between the application data and data collected by a remote sensor. An example is a weigh station bypass application where the vehicle contains a computing device such as a mobile wireless device 16 that contains a mobile application that includes instructions for carrying out the method steps disclosed in this patent document. The computing device may or may not actually be physically wired to the vehicle, but the vehicle information is included in the data files belonging to the user profile logged into the mobile application that is running on the device. The vehicle data may or may not actually reside on the computing device, but may be stored remotely in one or more servers (which may be located anywhere) accessed by the central system 10. The actual storage location of user profile data is not critical to this process. When the vehicle approaches a weigh station, a mobile application on the computing device uses user profile information to activate a bypass request sent via the central server 10 to local law enforcement. The user profile may contain information on the vehicle, the driver and the carrier to support the bypass request process. The mobile wireless device 16 carried by the vehicle follows the method steps 30 and 36 of FIG. 2 to activate the bypass request. The dataset sent by the mobile wireless device 16 to the central service 10 contains user profile information.

There is also a value-added service to including remote sensor data in the user profile data set. For example, if a vehicle travels over a weigh-in-motion (WIM) system 70 installed in a roadway 72 (FIG. 5), that system collects the weight of the vehicle as it passes over the WIM sensor. This steps corresponds to part of step 32 in FIG. 2. Use of the central service 10 allows the data collected from the WIM sensor 70 located on the roadside 72 to be associated with the vehicle data in the user profile dataset. This is not an easy task as these are independent systems and roadside sensor systems are not usually designed to be synchronized to outside information systems. The historical development of roadside sensors systems as stand-alone systems means most configurations do not communicate with third party systems, let alone in a real-time synchronized fashion. This makes sense as these systems were mainly designed as data collection systems, where data is collected from the sensor and stored locally for future retrieval. Over time, these stand-alone systems have been enabled with remote data access which allows user to access the local data stores remotely through a data communication link. Some systems accommodate automated remote data reporting following a batched or real-time data push paradigm, but not with any design to synchronize the data to passing on-board vehicle systems. A category of weigh-in-motion systems are also used as part of integrated vehicle screening systems. In the case of integrated screening system, the local inroad sensor systems are often integrated with other roadside sensors, including cameras or dimensioning type systems 74 to support automated vehicle screening applications. More recent developments in automated vehicle screening systems have finally succeeded with providing a link between roadside sensors 70 and onboard vehicle systems. Dedicated short range communication (DSRC) systems utilize direct radio communications to support the integration of roadside sensor with vehicle onboard systems utilizing the installation of dedication radio communication equipment both at the roadside and onboard the passing vehicle. This technology whoever has had limited success because of the costs associated with the purchase, installation and maintenance of the DSRC systems at the roadside. Despite the costs, DSRC roadside equipment and vehicle-mounted DSRC transponders are used throughout the world in electronic tolling applications and automated vehicle screening systems.

Thus, an example of this application in the vehicle screening application includes the following process. A vehicle with an onboard RFID system and mobile application with geofence capability approaches an inroad sensor location 70. The primary roadside sensor is a weigh in motion system and it is integrated with a roadside DSRC radio transceiver. Weigh in motion systems are conventional. As the vehicle passes over the WIM sensor 70, the vehicle onboard RFID transceiver established a direct communicate link with the roadside DSRC transceiver. The roadside controller software associates the vehicle DSRC data with the roadside WIM data. This data is utilized in an electronic screening process to determine if the vehicle should report to an inspection facility or granted a bypass. In order to communicate the screening outcome back to the onboard vehicle system, the roadside controller software re-utilizes the roadside DSRC communication link to the onboard DSRC transceiver. Since the roadside controller software requires time to complete its processing, the screening process result may be transmitted from the roadside back to the onboard DSRC transceiver at a different location from the initial communication. This downstream location requires the installation of another roadside DSRC transceiver to send the screening results to the onboard DSRC transceiver. Newer 5.9 Ghz DSRC radio communication ranges can eliminate the need for multiple roadside DSRC sites to complete a screening event by utilizing a single long range DSRC transceiver site to complete all the communication needs between roadside and onboard systems. Despite advances in DSRC technology to limit the amount of roadside infrastructure to support roadside-to-vehicle data associations, the infrastructure costs remain significant and the primary challenge to any wide deployment of the technology outside the relatively high-value applications of tolling and weigh station bypass.

Figure 5:
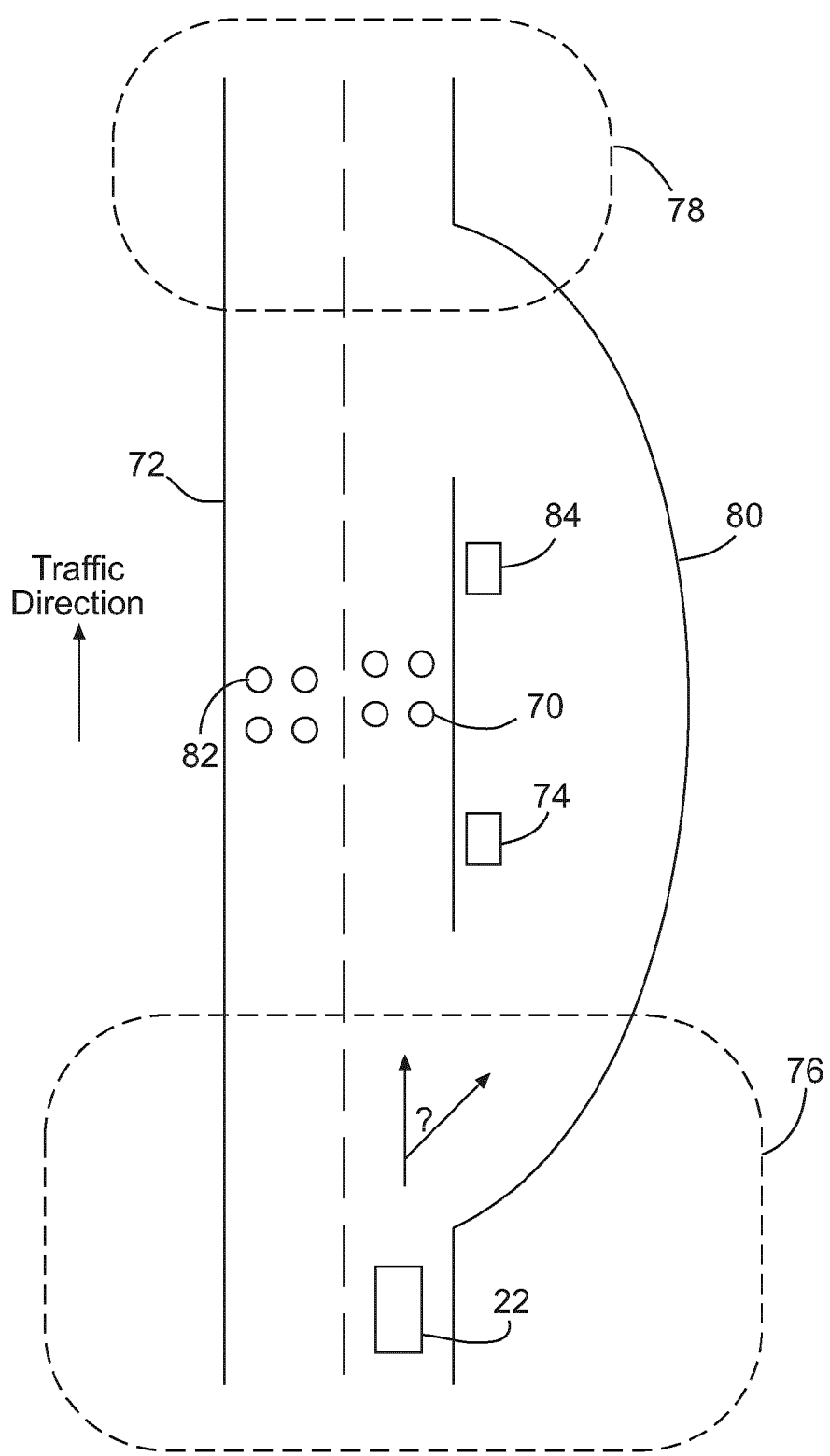
FIG. 5 shows an example of a vehicle inspection site.

The central system 10 overcomes the challenge of roadside to onboard data association by eliminating the need for direct communication links between the roadside sensor systems and onboard vehicle systems 16. This is accomplished through several newly developed methods outlined below:

Time synchronization: The local roadside sensor is retrofitted with a remote data output link. This data link has access to a third party time server such as the universal time server. A data association software processor takes inroad sensor data and associates it with a UTC time stamp. Independently, the vehicle 22 is outfitted with an onboard computing device such as mobile wireless device 16 running a mobile application as taught in this disclosure. The mobile wireless device 16 begins its own UTC time synchronization process. Referring to FIG. 5, as the vehicle 22 approaches the roadside sensor 70 located at a fixed and known GPS coordinate, the mobile application is triggered by the mobile wireless device's reported GPS location coordinates and begins associating the device's GPS location coordinates to UTC time stamps. Both the roadside sensor data with a fixed GPS location and the GPS-tagged onboard system data are associated with a UTC time stamp series. This step corresponds to step 40 in FIG. 2.

The linking of the roadside sensor 70 and the onboard sensors 16 to a shared third party UTC time series enables the central system 10 to utilize simplified algorithms to associate the data output of the roadside system to the vehicle data of the onboard system without ever establishing a direct communication link between the two systems. The remote sensor data association process determines the specific UTC time that the mobile wireless device 16 (and hence vehicle) travelled over a fixed roadside sensor 70 by searching the GPS data log for the exact time that the vehicle crossed over the known fixed GPS location of the roadside sensor system. Once the exact time is calculated, then the data logs from the remote data sensor are searched for data outputs produced at the same UTC-stamped time. The data produced from the roadside sensor is then associated with the data on the vehicle onboard system for screening or tolling applications. The screening and tolling applications comprise taking an action according to step 42 in FIG. 2. The successful association of roadside sensor data to onboard vehicle system data is accomplished without the need for any direct communication link between the two system and hence without the need for investment in a costly infrastructure to support DSRC communications.

Methods are also provided to reduce or eliminate the possibility of incorrect data associations being produced by multiple vehicles travelling within the GPS accuracy limits. Examples of this include a vehicle travelling closely behind another vehicle. The data association process preferably scrutinizes the data output of the roadside sensor to determine vehicle spacing and whether it falls outside acceptable parameters required to match with confidence. This takes into consideration the reported GPS accuracy of the onboard system device. In the event that a single onboard system cannot be confidently matched to a single roadside sensor data output event, then the remote data sensor process will flag the data association with a low confidence rating.

Another example is a vehicle present in adjacent lane: If the GPS accuracy of the onboard device cannot distinguish position between adjacent lanes (for example on a multiple lane roadway 72), then UTC time synchronization technique does not address the possibility of the remote data association erroneously associating roadside sensor data from another vehicle to the vehicle data associated with the onboard device 16. This may occur when the vehicle 22 is travelling in an adjacent lane to the lane that contains the roadside sensors 70, while another vehicle (may or may not be another vehicle carrying a mobile wireless device 16) travels beside it in the sensorized lane. The roadside sensor data produced at the time the mobile wireless device 16 crosses the lateral placement of the roadside sensor 70 is not actually produced by the vehicle containing the onboard unit. Instead it would be data produced by the vehicle travelling alongside the vehicle with the mobile wireless device 16 and intersecting the roadside sensor location at the same time, but in the sensorized lane. In this event, the remote data association process will include methodologies to eliminate this type of mis-association error.

Adjacent lane sensorization: data association algorithms may allow input from adjacent lane sensors 82 that will detect the presence of another vehicle in the adjacent lane at the time of the remote data acquisition. Vehicle classifiers, loop traps, vehicle detectors are some of the types of sensors that can be used. The data association process includes adjacent lane sensor data to determine if a potential data mis-association exists. There may be multiple lanes of sensors, so that the roadside sensor integration is to a combination of roadside sensors that support the process of recording the data produced by one instance of a vehicle event and associating it to that same vehicle's data in the central processing system. For example, there may be four lanes of traffic, two WIMs and two classification loops. The central system 10 may monitor all of the sensors to try to determine that the vehicle-related information from the sensors that is received by the central system 10 belongs to the vehicle with the mobile wireless device 16.

In an alternative embodiment, instead of UTC synchronization or in addition to UTC time synchronization, an additional roadside sensor 84 may be provided that supports a unique identification of the vehicle 22 carrying a mobile wireless device 16. This can be an automated license plate recognition system or radio transceiver system using protocols like Bluetooth, WiFi, or WiMAX standards. With this method, the roadside dataset includes the vehicle identification data and the remote data process includes a matching algorithm with the onboard vehicle dataset (for example stored license plate number or onboard device WiFi identification).

Instead of replicating the costly nature of deploying expensive DSRC equipment, this method exploits the capability of smart mobile wireless devices 16. The location-based services activate the onboard wireless transceiver as it approaches a roadside sensor 70. The consumer wireless devices are not designed for DSRC communications between a fixed sight and a moving vehicle. The time required for the radio signals to support a data packet exchange and communication handshake exceeds the time window provided by the onboard units signal strength. To address this limitation, the digital handshake layer may be eliminated and the roadside transceiver only need operates to detect the presence of a unique radio signal identification and log its signal strength as it passes by the roadside transceiver. No direct communication between the onboard transceiver and the roadside transceiver occurs. The detection of one unit's emitted radio signal by the other unit and the logging of the received signal strength as one device passes by the other is all that is required to support augmented remote data association processing with a unique identifier. In this case, the data association matching algorithm is augmented to account for the onboard device unique ID present in the radio transmission. The software searches for the peak signal strength to determine when the onboard device was closest to the roadside transceiver. It then uses the UTC time match to that signal strength peek to match data collected at the same UTC time from other roadside sensors. The elimination of a direct communication layer between a roadside radio transceiver and the onboard radio transceiver, and utilizing only the base signal detection layer, also eliminates the need for specialized purpose-built DSRC equipment on the roadside and onboard the vehicle. This dramatically lowers the cost of this solution. For example, if the mobile wireless device 16 is a consumer smartphone with WiFi transceiver and the roadside wireless transceiver is a consumer grade wireless WiFi router, then the broadcast unique ID from the smartphone can be detected and its signal strength logged as it passes by the roadside device. The need for a purpose-built DSRC transponder (like those used in toll road applications) and purpose-built roadside radio transceiver, powerful enough to both detect and establish communications with a passing DSRC onboard device, is eliminated.

This augmented remote data association technique provides higher confidence in the data matching algorithm as vehicle location is better known than in the case of a low-accuracy GPS-only based location scheme where the location of the vehicle with the mobile wireless device is limited to the GPS accuracy of the mobile wireless device. With improved accuracy, the remote data association process may be used to support integration with other roadside devices such as gates, traffic signals, message boards, etc. An example of this would be a vehicle outfitted with a mobile wireless device 16 pulls up to a gated toll booth, and the remote data association process is used to signal the gate 100 (FIG. 6B) to lift when needed for the vehicle to proceed. The lifting of a gate is a further example of an action in method step 42 of FIG. 2. The central system 10 may activate a toll gate or other roadside equipment.

An advantage of the location-based transaction system for toll road payments is the ability to support toll road payments without the need for any direct integration to existing roadside equipment. In the case of toll roads, toll payment using the central system 10 occurs independently from communications, billing and payment transactions with the toll road operator. The location-based transaction occurs between the mobile wireless device 16 and the central service 10. The payment amount is approximated with back office access to existing toll rates and collected as the vehicle utilizes the toll area. The toll road operator's vehicle enforcement system (VES) detects a vehicle 22 passing a toll service with equipment like an automated license plate recognition system. The toll road operator VES system may not be integrated in real-time with the central system 10 and needs no input signal to identify the vehicle as being registered with the central system 10 or that the central system 10 service has already collected payment from the account holder. The VES system independently identifies the vehicle and the vehicle data is sent to the toll operation back office system for billing. Prior to an invoice being sent to the registered owner of the vehicle (via license plate registration), the toll operator back office runs the license plate data against the registered accounts database. This is done to eliminate the possibility of violation (toll charge plus additional fees, printing and mailing costs) being sent to an existing, registered and funded account holder on account of a failure of that account holders DSRC transponder not communicating successfully with the toll operators roadside DSRC transceiver. If the license plate number for a vehicle collected from the VES system matches the license plate number of a valid registered customer, the toll charge is automatically deducted from the account holder's balance and the violation processing is terminated. It is through this automated process of running VES collected license plates against registered account holder databases, that the central system 10 can provide toll payment services without the integration of roadside DSRC or VES systems. The central system 10 service provides the toll agency with a list of all its registered account holders and their license plate numbers. When a vehicle with a mobile wireless device 16 approaches a toll gantry, the mobile application may instruct the driver to utilize the freeflow electronic payment lanes. The VES system detects the absence of a DSRC transponder and collects the license plate of the vehicle 22 for violation processing. The violation processing checks the license plate against the toll operators registered client list and finds the license plate is registered under the central system 10 account. The violation is reverted back into standard electronic billing processes and the central system 10 is sent the toll charge for payment. The central system 10 system reconciles the actual toll operator charge for the toll event against the toll charge approximated with the location-based transaction event. In this method, the central system 10 facilitates automated toll payment transactions, without ever integrating the system to existing roadside systems in real-time.

While this is an advantage for open-road tolling applications and toll road operations with electronic payment freeflow lanes, it does not provide a solution to gated toll operations. Gated toll operations that utilize electronic payment systems utilize DSRC communication systems to control gates. Vehicles outfitted with DSRC transponders pull up to a toll gate and the onboard DSRC unit communicates with a roadside DSRC transceiver. The lane controller validates the transponder account number and if valid, lifts the gate for the vehicle to proceed. Unless the mobile wireless device 16 can also communicate with a toll operation's roadside lane controllers, the service will not work at gated toll operations. Since toll road DSRC systems are proprietary and there is no industry-wide communication protocol, another method is required to communicate with a lane controller.

An innovation is the use of the location-based transaction to generate a unique identification code or bar code on the mobile wireless device 16 as the vehicle 22 approaches a toll gate. The driver of the vehicle can then enter this identification code manually or via bar code into an electronic device co-located with the gate equipment. This code would be utilized by the lane controller to validate an account and open the gate. This method requires the installation of roadside equipment to accept the unique code input and requires integration of this equipment with the lane controller. However, this equipment is less expensive than DSRC equipment and provides toll operators with another automated payment mechanism.

Various methods of vehicle traffic control may use a central processing system 10 connected to a telecommunications network, by a mobile wireless 16 accessing, for example through a web service, the central system 10. The accessing includes the central system 10 receiving a first dataset from the mobile wireless device 16 upon the mobile wireless device 16 entering a pre-defined geographic area. The central system 10 then compares at least a portion of the first dataset with a second dataset from a third party provider and taking one or more actions based on the associating step. Besides the toll station and weigh station examples described above the dataset from the third party provider may comprise information on parking in a location near to the geofence, or a traffic related problem, such as traffic congestion, or an emergency, such as the presence of bad weather or hazards (for example an accident, road damage or bridge out). The action may then comprise a suitable notification or warning to the mobile wireless device that is visible (such as a graphical image or sign displayed on the mobile device), audible or tangible to the user, followed by the user taking some action, such as parking the vehicle, or taking evasive action. In the case of parking, the central service 10 may also secure a reservation of a parking spot by communication with a third party parking provider and send a notification of the reservation to the mobile wireless device 16. The notification may include a reservation code. In this case, the reservation comprises parking related information and taking an action comprises forwarding parking directions including the reservation code to the mobile wireless device. The action may also comprise the vehicle following the parking directions.

Taking an action may comprise associating datasets from the mobile wireless device and from a third party provider, as for example in a weigh station application associating the weight of a vehicle with the corresponding dataset produced by the mobile wireless device when the vehicle passed over a WWI sensor.

Figure 6A:
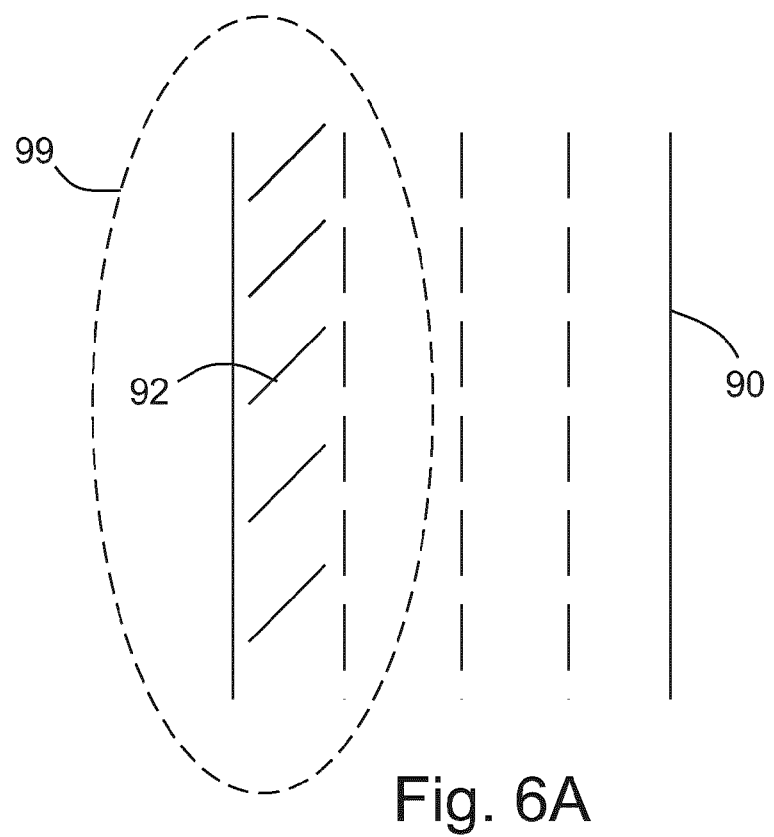
FIGS. 6A and 6B illustrate toll location geofences.
Figure 6B:
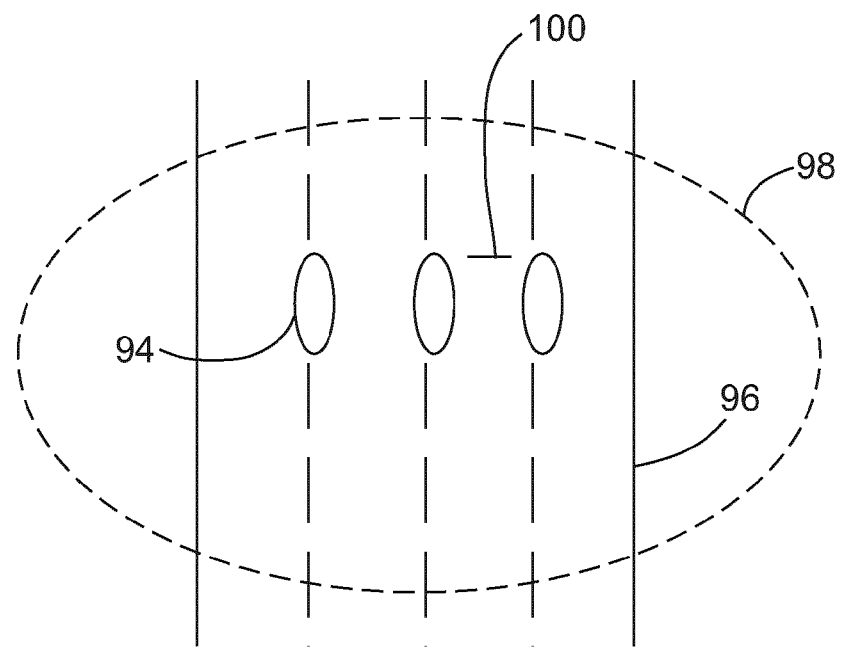

A central system 10 may be configured, for example by use of a software application running on one or more servers (including in the cloud) to carry out any one or more of the several applications disclosed including the weigh station, toll station, parking and traffic related problem notification. The central system 10 may include modules related to each application. Upon the mobile wireless device 16 entering a geofence associated with a specific one of the applications, the central processing system 10 may determine from the geofence which application is to be used and then select the corresponding application. Thus, if the geofence corresponds to a weigh station, for example as shown in FIG. 6A or 6B, the central system 10 may automatically determine which module to use from the geofence code sent from the weigh station. If the geofence ID is associated with both a weigh station and toll station, then both modules may be activated. The mobile wireless device 16 is also configured by running a location services application on the mobile wireless device 16 for carrying out the disclosed steps.

FIGS. 8-16 show exemplary formats of virtual road signs used in the Drivewyze™ PreClear application which can reside on partner electronic logging devices (ELDs), smart phones, or tablet devices. The virtual road signs help guide a driver in three situations: Driver is approaching an inspection service site. Driver is given a maneuver instruction near the inspection service site. Driver is exiting or passing an inspection service site. The virtual road sign images used in this document are similar to those found on partner electronic logging devices. Virtual signs used on different devices vary only in height, width, and orientation, however, the application works the same on all devices.

The Drivewyze™ PreClear application provides commercial vehicle drivers access to the Drivewyze service network. The Drivewyze service network uses the GPS technology built into smart phones, tablets, and ELDs to operate a highway transportation service network in participating countries, such countries, such as the US and Canada. The virtual signs will vary for commercial vehicle drivers subscribed to the Drivewyze™ PreClear service versus drivers who are only using the most basic service that is Free to all. The Subscription service will request bypass clearances for the approaching inspection site on behalf of the driver, providing the resulting maneuver instructions, whereas the Free service simply notifies the driver that the inspection site is approaching and to follow normal procedures. When a driver has another transponder-based service, there is a possibility that the Drivewyze PreClear application and the transponder could provide conflicting instructions. Therefore, to avoid driver distraction and ensure safety, Drivewyze™ will yield to your other bypass services in operation at that inspection site. In these cases, the virtual road sign is limited to the "Follow Transponder" sign.

Figure 7:
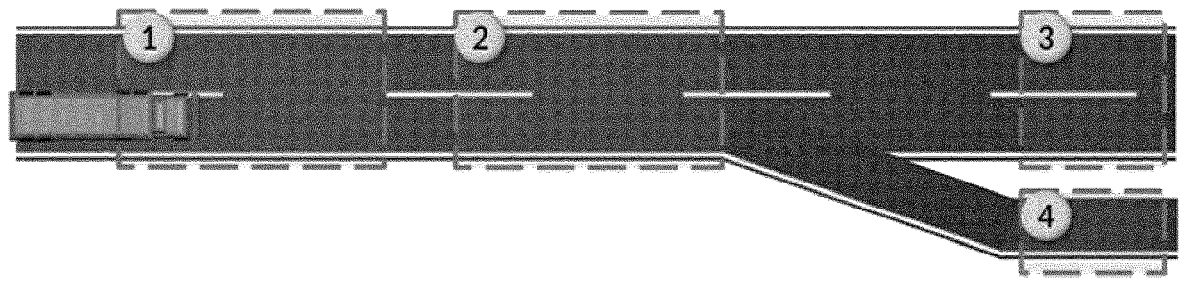
FIG. 7 illustrates geofence locations at a vehicle inspection site.
Figure 8A:
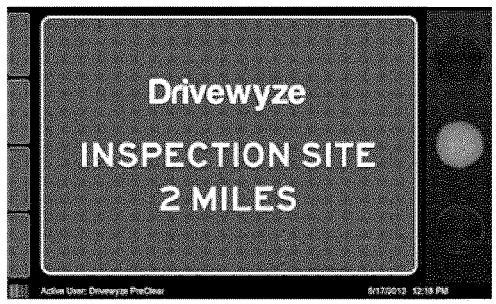
FIGS. 8A-8B, 9, 10A-10B, 11, 12, 13A-13B, 14, 15, 15A-15B, and 16 show examples of virtual or graphical signs that may be shown to a Drivewyze™ traffic control system user.
Figure 8B:
Figure 9:
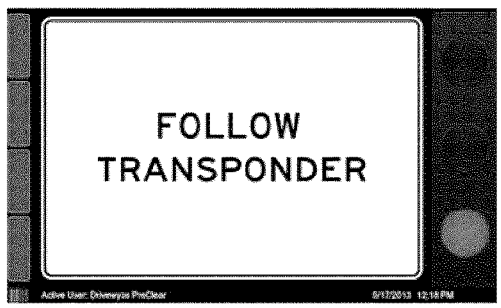
Figure 10A:
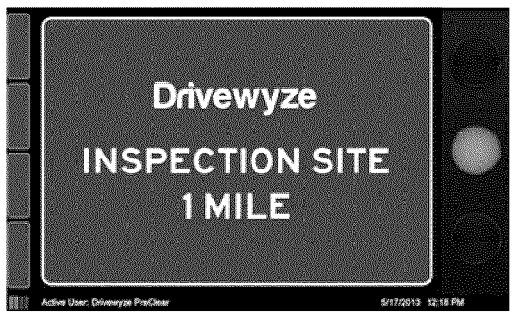
Figure 10B:
Figure 11:
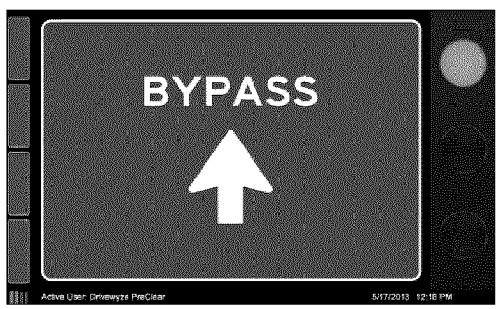
Figure 12:

Geo-fencing is a technical term to describe the technology that provides a virtual location of a real-world geographic location using GPS coordinates and data access. Each inspection site may use for example four geo-fences as shown in FIG. 7. In a first example, a vehicle is approaching an inspection site in approximately two miles. FIG. 8A shows an example graphical or virtual sign for the situation where the site is a Drivewyze™ Serviced Weigh Station or Inspection Site and FIG. 8B for the situation where it is a Non-Drivewyze™ Weigh Station or Inspection Site. FIG. 9 shows a virtual sign for the case where the driver has a different service. In a second example, a vehicle is approaching an inspection site in approximately one mile. FIG. 10A shows an example graphical or virtual sign for the situation where the site is a Drivewyze™ Serviced Weigh Station or Inspection Site and FIG. 10B for the situation where it is a Non-Drivewyze™ Weigh Station or Inspection Site. FIG. 11 shows a sign that might be given approximately one mile from a Drivewyze™ inspection site, and the Drivewyze™ PreClear application receives a bypass privilege response, while FIG. 12 shows a sign that might be used where, approximately, one mile from the Drivewyze inspection site, the Drivewyze™ PreClear application receives a pull in response. FIG. 12 shows an example graphical or virtual sign that might be displayed approximately one mile from the Drivewyze™ inspection site when the Drivewyze™ PreClear application recognizes the driver is not a subscriber to the Drivewyze™ service or the inspection site is not serviced by Drivewyze™.

Figure 13A:
Figure 13B:
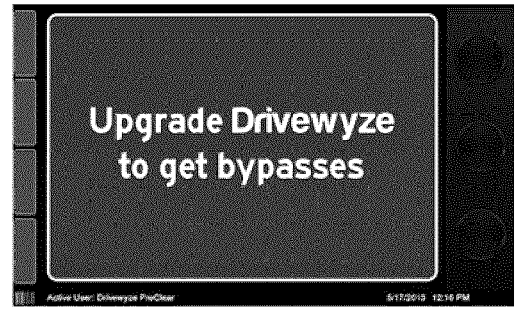
Figure 14:

When the Drivewyze™ application detects the driver is leaving the service site either FIG. 13A or 13B or 14 respectively may be displayed to the user, for example for a defined period such as 30 seconds for a Drivewyze™ Serviced Weigh Station or Inspection Site (Subscription Model) or a Drivewyze™ Serviced Weigh Station or Inspection Site (Free Model) or a Non-Drivewyze Weigh Station or Inspection Site.

Figure 15:
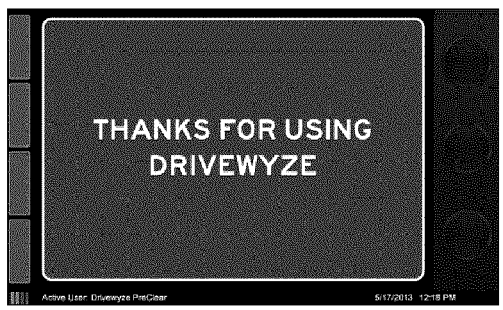
Figure 15A:
Figure 15B:

FIG. 15 may be shown, for example, for 30 seconds where the Drivewyze™ application has returned bypass maneuver instructions and the driver has now passed the inspection site. FIGS. 15A and 15B may be displayed respectively to the user where the Drivewyze™ application has returned a "Follow Transponder" instructions and the driver has now passed the inspection site, for a Drivewyze™ Serviced Weigh Station or Inspection Site or Non-Drivewyze™ Weigh Station or Inspection Site.

Figure 16:

If the Drivewyze application detects an error for any reason, approximately one mile from the inspection site, FIG. 16 may be displayed to the user whether for a Drivewyze or Non-Drivewyze Weigh Station or Inspection Site.

The virtual signs on all platforms and devices may be created using an image as the background with system fonts displayed over top of the image to display the message. The use of virtual signs may also be applied to other transportation service sites such as truck parking, high crash zones and toll roads to warn of the distance to the approaching site, and related information such as, in the case of truck parking, whether a parking space is available and if so, where it is located, in the case of a high crash zone, the location of the zone and whether it is a particularly hazardous time of day, and in the case of toll roads, the amount that needs to be paid, or an option to avoid the toll road. In the case of a toll station application, the message sent to the mobile device may comprise an indication of what lane to enter at the toll station. The lane indicated may depend on whether the service being provided to the mobile wireless device is a free or paid (subscription) service. A traffic control decision may be based on a combination of factors known about the mobile wireless device including user information, whether the account is paid or not paid, driver information such as driver's license, vehicle information such as VIN, LP, carrier information such as the name of a trucking company and its safety record and other information specific to the mobile wireless device, the user and the vehicle.

In a manner of operating the central processing system 10, the system may be partially enabled in a free service in which some functionality of the service is disabled. As indicated in the above signs, one of the disabled functions may be the sending and processing of a bypass signal. In the partially enabled service, the user or vehicle receives only a message to upgrade the service or another notice, but not a bypass notice. The central processing system 10 operates when fully operating by receipt of location signals sent from a mobile wireless device carried by a vehicle and the central processing system sending signals to the mobile wireless device to direct the movement of the vehicle as indicated above for the various examples, including vehicle clearance, toll payment, parking and hazard avoidance. When partially enabled, the central processing system may be operated freely without subscription by an economically interested party related to the vehicle, which could be a vehicle or fleet owner for example. Even when full operation is disabled, the traffic control system continues to monitor the movement of the vehicle that carries the mobile wireless device.

Figure 17:
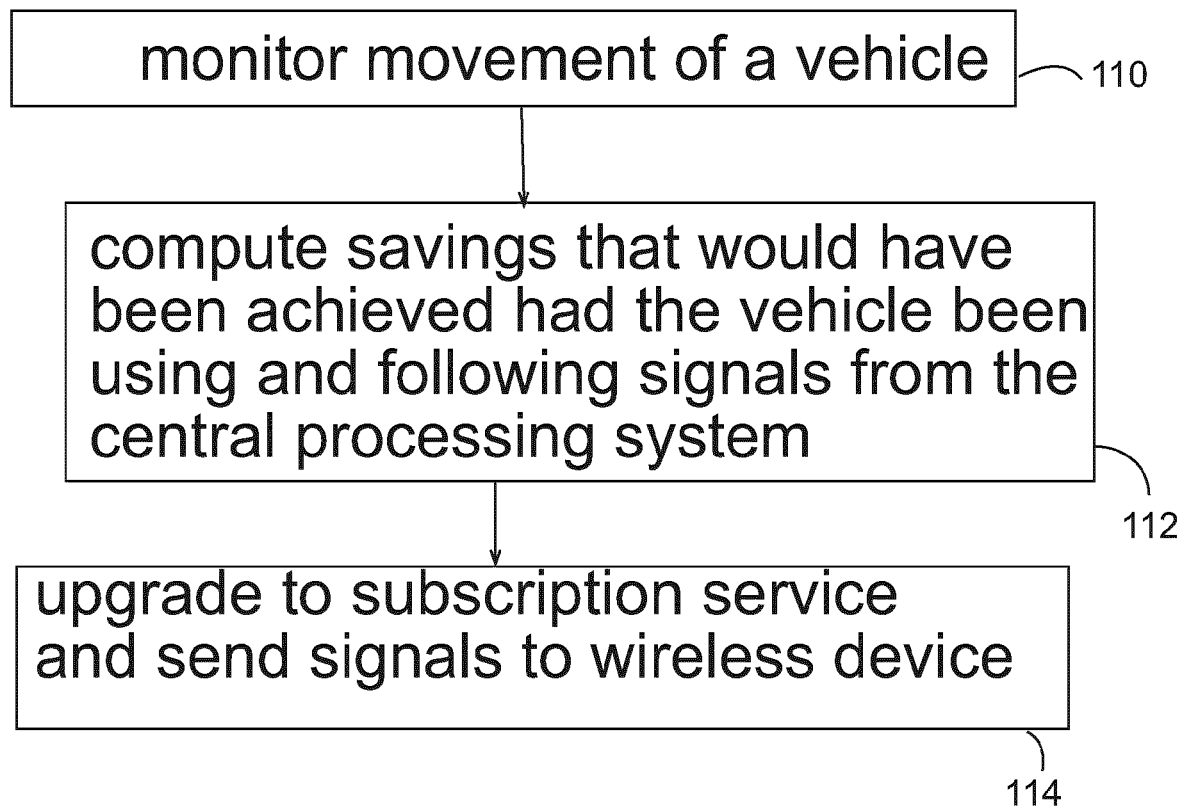
FIG. 17 is a flow diagram showing steps of operation of a system of vehicle traffic control to which a user is initially not subscribed.

In addition, in the partially enabled mode, the central processing system 10 calculates or computes savings (ROI or return on investment) that would have been achieved had the vehicle been using and following signals from the central processing system (for example the bypass signs mentioned above) or payment of tolls. Referring to FIG. 17, in step 110 the central processing system monitors the movement of a vehicle, for example using the method illustrated in FIG. 3. In step 112, the central processing system computes savings that would have been achieved had the vehicle been using and following signals from the central processing system. Upon receipt of a user initiated control signal, such as a message sent from the mobile wireless device, in response to a prompt from the central processing system, the central processing system 10 may upgrade the free operation of the central processing system to a subscription service as indicated in step 114, upgrading to full operation in which the central processing system sends signals to the wireless device.

An example of an ROI calculation would be

ROI=[(# projected bypasses*$savings_per_bypass)/ ($subscription_fee)]−1

If they are looking for a delta (difference when compared) to current bypass provider, then ROI=[((#projected bypasses−actual bypasses)*$savings_per_bypass)/($subscription_fee)]−1 where projected bypasses is dependent on user's driver information and/or vehicle information and/or carrier company information at time of location-based event set against a third party rules engine to calculate probability of bypass given real-time rules of third party rules engine. Actual bypasses is the number of times the vehicle was recorded as having driven past an inspection site. Savings per bypass can be a static reference or can be calculated based on the amount of time the vehicle stayed within the geographical limits of an inspection site X operating costs per unit of time. The ability to use this engine to calculate location-based ROI can be used for tolling as well, except that instead of savings per bypass, it is savings per toll transaction. For third party application ROI calculations in the future, the calculation will be based on savings per projected transaction. All ROI calculations utilize given information at the time of the actual location-based data collection against third party rules engines at the time of the transaction. The ROI may be sold as a stand-alone service to other third party vendors.

The period for the ROI can be any number of months, as long as you use the full number of bypasses for that period and the full fee charged over that period. In one example, a model has calculated $savings_per_bypass=USD $8.68 currently.

The ROI calculations are created with analytics using GIS, location-based services plus the ability to determine what the prospective clients 'behavior' (use of service) will be.

The clients themselves does not know and cannot control what behavior they will have on the use of the system, because it is part determined by a third party. In the case of weigh station bypass, it is the servers running a government agencies business rules that determines what a client will experience (e.g., greenlight/redlight) and thus their behavior (and hence ROI). We can calculate this not just because the client interacts with the system, but because of a client's safety and historical record (account details) used by third parties to drive the behavior of the system. In the case of weigh stations, tolls roads or navigation systems, third party data or systems that the actual user does not have access to, and does not interact with directly, impact ROI calculation. Analytics may be run on this multi-party dependent system to project ROI based on actual events that occur (their visitation and the state of their account details interacting with third party systems). The exact ROI they would have received had they used our services may be calculated based on their historical location visitations and account-based information. This is affected not just by their input into the system, but the input of third party data systems that affect the ROI calculation.

This is different for every location and different for every user based on their visitation of that location and their account details which impact the ROI they would receive is far beyond anything using static ROI calculators.

Further, the location-based data, account data and third party data (dependent and independent data systems) may be taken to overlay additional service offerings, feature offerings or an expansion of existing service locations to calculate or recalculate ROI takes data-driven business decisions to a whole new level.

The system disclosed here is a location-based service that measures the geographical movements of an application-enabled-GPS device to derive the physical movement of a user and/or the physical movement of a vehicle that the user is assumed to be within during the operation of the service.

We then take discrete information associated with the user and/or chosen vehicle (driver's license #, license plate #) to calculate the behavior of the application if the back end service was enabled.

The behavior of the application is service-dependent not user-interaction dependent. It does what the back-office service tells it to do, not what the user tells it to do.

The service takes the user's 'driver info' and/or vehicle information and/or related carrier information and uses the information to determine the odds of a user/vehicle physical movement being different from their actual or historical movements and any resulting benefits/ROI derived thereof.

The user/driver/vehicle's ability to change routes is not only based on account information provided by user, but it is determined by the processing of that offline information against third party systems (government screening systems, toll payment systems) which either provide approval or no approval for the route to be changed. This is important because the routes in these cases are all restricted and non-public and require the authorization of some governmental authority to 'allow' passage. In the case of weigh station bypass, the government needs to look at user associated information and determine if they get a bypass. Automatic collection of tolls is the same.

Simulations of the historical GPS routing data can be run along with the user-associated driver/vehicle/carrier data against real-time agency systems to determine the odds of a user being authorized to change driving behavior/routing. The system can then take the odds of the route change (and associated savings with not having to stop) and calculate an ROI report for the account holder of the service. In most cases, the user of the application is a fleet driver, and even though the route he/she takes may be projected to change based on use of service delivered through mobile application, it is actually the fleet owner that may be most interested in the ROI report as it affects the efficiency of good movement for the entire fleet.

The same algorithms may be used to report actual ROI using the same information once a client subscribes to the service. So in this case, it is actual ROI versus projected ROI using the same reporting mechanisms.

The disclosed free service has embedded data collection and utilization calculation algorithms. The free service collects the location-based data of the users and calculates their projected utilization rate of the subscription (paid) service without needed to contact the users. The free service may be distributed by partners. The operator of the traffic control system may collect the user location-based data and run that data against a location-based service footprint to calculate if the customer would be worth contacting in the first place. This is a data-driven model to customer acquisition that uses analytics to pre-qualify prospective customers without using traditional mass marketing techniques (and costs).

The free service takes the analytics data of projected high utilization prospects and either contact them directly or automatically offer them free pilots by automatically or manually upgrading their free service to a free pilot of the paid or premium service.

The ROI data is not just based on the number of times a free users is logged in at one of the Drivewyze™ transportation service sites. It may take into account specific entry and exit times, calculated speeds, potential additional integrated data points such as duty status, vehicle speed, driver remarks in console, and whether our service would have given them a bypass- to generate time, fuel, and costs they incurred by NOT using the paid service. The operator may then run the calculations of these savings if they used our service against the cost of our service to generate ROI/benefits reporting for each user.

The operator can even use the location-based data algorithms to ascertain whether the prospective customer is currently using a competing service by the profiling of their driving actions at inspection sites around the country known to support other bypass programs.

In one feature, the free service can calculate the ROI a user is currently getting from a competing service (using a stand-alone transponder) where the competing service provider cannot even generate this information. The operator can then provide a report to a prospective client that maps out the current costs with or without a competing service provider versus using the operator's service in addition to or instead of the competing service.

The traffic control system application may be distributed or loaded onto hardware platforms that currently exist in millions of trucks.

Additionally, there is the potential for these analytics to help direct the addition and changes of features to the product and service offerings. For instance, we can add the toll gantry locations to the data collection site list or we can recalculate bypass rates IF we utilize data not currently utilized for bypass. For toll analytics, we can determine which toll service and which toll sites to roll out first. For new third party data integration, we can calculate the impact on utilization/ROI of a new service feature without actually building the feature.

This location-based analytics service may also provide analytics services to other vendors selling technology into moving vehicles. For instance, a route optimization service has to find customers and pilot their service in order to prove ROI to a prospective client. Using DW analytics, we could run the location-based historical data of a carrier against the route optimization processes of the third party vendor. We could then generate utilization and ROI reports for prospective clients based solely on their historical driving patterns. This is real ROI data based on real driving patterns rerun with the benefits of routing hindsight. Vendors selling services to drivers can benefit enormously from this type of auto-qualification and calculate utilization methodology.

What is claimed is:

1. A method of vehicle traffic control using a central processing system connected to a telecommunications network, the method comprising:
   receiving a first dataset at the central processing system from a mobile wireless device upon the mobile wireless device entering a pre-defined geographic area at a vehicle inspection site, the mobile wireless device being carried by a vehicle and the first dataset including vehicle-related information and location data obtained by monitoring a location of the mobile wireless device;
   based on information in the first dataset, automatically activating an application that causes the central processing system to compare at least a portion of the first dataset with a second dataset from a third party provider, the second dataset including rule-based data, including safety data, related to movement of vehicles along roads;
   based on the comparison, generating a signal for controlling movement of the vehicle with respect to the vehicle inspection site; and
   sending the signal to the mobile wireless device, the signal causing, on the mobile wireless device, a display of text within a visual representation of a virtual highway guide sign that is not otherwise physically present, instructing the vehicle whether to bypass the vehicle inspection site or not,
   wherein sending the signal to the mobile wireless device depends on an operating state of the central processing system, the central processing system operating freely without subscription in a state of operation in which some functionality of the central processing system in a fully operating state is disabled, the disabled functionality including the signal for controlling movement of the vehicle with respect to the vehicle inspection site that would be sent to the mobile wireless device based on the comparison if the central processing system were in the fully operating state.

2. The method of claim 1 in which receiving the first dataset comprises downloading from the mobile wireless device to the central processing system the first dataset containing the location data and vehicle-related information through a web service.

3. The method of claim 1 in which the second dataset is obtained by the central processing system downloading, from the third party provider to the central processing system using a web service, a file containing the second dataset.

4. A method of vehicle traffic control using a central processing system connected to a telecommunications network, the method comprising:
   enabling a vehicle clearance system, in which the vehicle clearance system operates by:
      receiving a first dataset at the central processing system from a mobile wireless device upon the mobile wireless device entering a pre-defined geographic area at a vehicle inspection site, the mobile wireless device being carried by a vehicle and the first dataset including vehicle-related information and location data obtained by monitoring location of the mobile wireless device,
      based on information in the first dataset, automatically activating an application that causes the central processing system to compare at least a portion of the first dataset with a second dataset from a third party provider, the second dataset including rule based data, including safety data, related to movement of vehicles along roads,
      based on the comparison, generating a signal for controlling movement of the vehicle with respect to the vehicle inspection site; and sending the signal to the mobile wireless device indicative of whether the vehicle is permitted to bypass the vehicle inspection site;

the signal causing, on the mobile wireless device, a display of text within a visual representation of a virtual highway guide sign that is not otherwise physically present, in which the visual representation of the virtual highway guide sign has a format that is dependent on whether the vehicle clearance system is subscribed to or free, wherein sending the signal to the mobile wireless device depends on an operating state of the central processing system, the central processing system operating freely without subscription in a state of operation in which some functionality of the central processing system in a fully operating state is disabled, the disabled functionality including the signal for controlling movement of the vehicle with respect to the vehicle inspection site that would be sent to the mobile wireless device based on the comparison if the central processing system were in the fully operating state.

5. A method of vehicle movement control, comprising:

while a mobile wireless device is being carried in a moving vehicle, periodically obtaining a location of the mobile wireless device;

comparing the location to a set of stored geographic areas;

when the location of the mobile wireless device is within any one of the set of geographic areas, communicating vehicle-related information and vehicle location information to a central processing system that comprises a vehicle screening system for determining whether the vehicle should stop at a vehicle inspection site and the geographic areas are areas around vehicle inspection sites; and upon the vehicle entering a geographical area corresponding to a vehicle inspection site, receiving at the mobile wireless device a message from the central processing system that causes, on the mobile wireless device, a display of text within a visual representation of a virtual highway guide sign that is not otherwise physically present, wherein the message is indicative of whether the vehicle should stop or bypass the vehicle inspection site, and a format of the visual representation of the virtual highway guide sign depends on whether the vehicle screening system is a subscription service or a free service, wherein receiving at the mobile wireless device the message from the central processing system depends on an operating state of the central processing system, the central processing system operating freely without subscription in a state of operation in which some functionality of the central processing system in a fully operating state is disabled, the disabled functionality including the message indicative of whether the vehicle should stop or bypass the vehicle inspection site that would be received by the mobile wireless device if the central processing system were in the fully operating state.

6. The method of claim 2 in which the second dataset is obtained by the central processing system downloading, from the third party provider to the central processing system using a web service, a file containing the second dataset.

7. The method of claim 4 in which the display of text is content indicative of whether the vehicle is permitted to bypass the vehicle inspection site, the text depending on whether the vehicle clearance system is subscribed to or free.

8. The method of claim 5 in which the display of text is indicative of whether the vehicle is permitted to bypass the vehicle inspection site, the text content depending on whether the vehicle screening system is the subscription service or the free service.

* * * * *

UNITED STATES PATENT AND TRADEMARK OFFICE
CERTIFICATE OF CORRECTION

| | | |
|---|---|---|
| PATENT NO. | : 12,229,847 B2 | Page 1 of 1 |
| APPLICATION NO. | : 17/069186 | |
| DATED | : February 18, 2025 | |
| INVENTOR(S) | : Heath et al. | |

It is certified that error appears in the above-identified patent and that said Letters Patent is hereby corrected as shown below:

On the Title Page

In the Abstract Item (57), 5th Line down: Delete "information provider" and insert -- information is independently processed by a third party provider --

Signed and Sealed this
Eighth Day of April, 2025

Coke Morgan Stewart
*Acting Director of the United States Patent and Trademark Office*